US007263505B1

(12) United States Patent
Forlai

(10) Patent No.: US 7,263,505 B1
(45) Date of Patent: Aug. 28, 2007

(54) METHOD AND APPARATUS FOR GENERATING A SALE OFFER OVER AN ELECTRONIC NETWORK SYSTEM

(75) Inventor: Luigi Forlai, Rome (IT)

(73) Assignee: Kyklos Entertainment S.R.L., Bologna (IT)

( * ) Notice: Subject to any disclaimer, the term of this patent is extended or adjusted under 35 U.S.C. 154(b) by 326 days.

(21) Appl. No.: 09/609,142

(22) Filed: Jun. 30, 2000

Related U.S. Application Data

(60) Provisional application No. 60/141,284, filed on Jun. 30, 1999.

(51) Int. Cl.
*G06Q 40/00* (2006.01)

(52) U.S. Cl. ............................. 705/37; 705/35; 705/26
(58) Field of Classification Search ............ 705/35–37, 705/1, 14, 80, 26
See application file for complete search history.

(56) References Cited

U.S. PATENT DOCUMENTS

| | | | | |
|---|---|---|---|---|
| 4,571,546 A | * | 2/1986 | Wilkinson .................. | 327/164 |
| 5,250,789 A | * | 10/1993 | Johnsen ....................... | 705/14 |
| 5,504,675 A | * | 4/1996 | Cragun et al. ................ | 705/14 |
| 5,978,013 A | * | 11/1999 | Jones et al. ................... | 725/23 |
| 6,058,379 A | * | 5/2000 | Odom et al. ................... | 705/37 |
| 6,115,698 A | * | 9/2000 | Tuck et al. .................... | 705/37 |
| 6,141,653 A | * | 10/2000 | Conklin et al. ............... | 705/80 |
| 6,223,163 B1 | * | 4/2001 | Van Luchene ................. | 705/1 |
| 6,317,718 B1 | * | 11/2001 | Fano ............................. | 705/1 |
| 6,338,050 B1 | * | 1/2002 | Conklin et al. ............... | 705/80 |
| 6,356,936 B1 | * | 3/2002 | Donoho et al. ............. | 709/206 |
| 6,401,080 B1 | * | 6/2002 | Bigus et al. .................. | 705/37 |
| 6,502,076 B1 | * | 12/2002 | Smith ........................... | 705/14 |
| 6,553,347 B1 | * | 4/2003 | Tavor et al. .................. | 705/14 |
| 6,915,271 B1 | * | 7/2005 | Meyer et al. ................. | 705/14 |

FOREIGN PATENT DOCUMENTS

JP 56027474 A * 3/1981

\* cited by examiner

*Primary Examiner*—Narayanswamy Subramanian
(74) *Attorney, Agent, or Firm*—Finnegan, Henderson, Farabow, Garrett & Dunner L.L.P.

(57) ABSTRACT

A method and apparatus are provided for generating a sale offer over an electronic network (such as the Internet). The method and apparatus may be used with a commercial sale system designed to increase the revenue income of Web site by offering, at a substantially discounted or virtually free basis, one more goods and/or services to visitors of the Web site. According to the features of the invention, the seller (who may be the owner or co-owner of the Web site) transmits a sale offer on the Web site for a high quality good or service, wherein the good or service can be purchased for free or a cost near to zero. The seller may make the offer visible and available to a number of perspective buyers, who are connected at that very moment to the Web site. According to an additional aspect of the invention, the sale offer may be available for only a very limited amount of time (e.g., one or more minutes) and may be offered at random or unpredictable times on the Web site in order to increase Web traffic to the site.

35 Claims, 26 Drawing Sheets

Administrator page

Room of Sell Offer
announcement transmission: [Random ▼]

Random Sell Offer
announcement transmission: yes ○ no ● days from [01 ▼] to [01 ▼]

year [1999 ▼]

transmit Sell Offer each [01 ▼] minutes [01 ▼] hours

Sell offer available for [____] seconds

[Submit] [Reset]

Dropdown options visible:
- Rooms: Random, attic, bathroom, bedroom, cellar, garage, gym, kids, kitchen, laboratory, livingroom, meditation, outdoor, readingroom, studio, wardrobe
- Years: 1999, 2000, 2001, 2002, 2003, 2004, 2005, 2006, 2007, 2008, 2009, 2010
- Days: 01–27

FIG. 7B

UBTV Happy Minute
Administrator page

BUYER DATAS:

tracking number assigned: 12345uuyrt8954

| | |
|---|---|
| 1st name: | John |
| 2nd name: | Doe |
| address: | 157, Oak Street |
| city: | Chicago |
| state (if USA): | Illinois |
| zip code: | 60302 |
| country: | USA |
| phone number: | 708-123456 |
| e-mail: | johndoe@interbusiness.com | delivery cost for John Doe U$ 52 sending acceptance form to buyer......ok

FIG. 12

METHOD AND APPARATUS FOR GENERATING A SALE OFFER OVER AN ELECTRONIC NETWORK SYSTEM

CROSS REFERENCE TO RELATED APPLICATION

This application is related to and claims priority of U.S. Provisional Patent Application No. 60/141,284, entitled "Method and Apparatus for Generating a Sale Offer Over an Electronic Network System," and filed on Jun. 30, 1999. The disclosure of U.S. Provisional Patent Application No. 60/141,284 is expressly incorporated herein by reference in its entirety.

BACKGROUND OF THE INVENTION

I. Field of the Invention

The present invention relates to electronic sale systems and related methods. More particularly, the invention relates to electronic sale systems and methods in which a sale offer is communicated from a seller to a buyer through an electronic network system or environment.

II. Description of the Related Art

The development of the Internet has brought about a profound effect on price competition for goods and services in the global marketplace. Web sites on the Internet, such as Amazon.com and CDNow.com, sell goods at prices substantially less than conventional distributors who typically employ printed advertisements to attract customers. These sites have been able to do so by utilizing the global reach of the Internet to expand the relevant sales market beyond the local market reached by printed advertising methods. Moreover, the start up costs of setting up an Web site are either less than or at least comparable to the start up costs associated with conventional sales methods. Accordingly, Web sites have been able to transfer cost savings to the consumer in the form of substantially reduced prices.

Other Web sites have also attempted to further reduces prices. For example, Buy.com has been able to sell software and other goods at below cost prices by recouping the losses through advertising revenue generated over the site itself. Moreover, FreePC.com has allowed consumers to receive free personal computers on the condition that the consumers provide personal data, which could be sold to advertisers. However, many of these endeavors collapse when the cost of procuring such goods outweighs the advertising revenue generated.

In general, conventional buyer-seller transactions are seller-driven in the sense that they focus on the methods or processes available to the seller. Typically, electronic sales systems involve sellers utilizing various electronic advertising media in order to attract potential buyers and, in some cases, to complete sales transactions. With an electronic sales system it is possible to reach more potential buyers than with other conventional sale methods (e.g., printed advertising). Electronic sales systems, however, suffer from the same drawbacks of conventional sales methods in that the seller normally absorbs the risk and cost of advertising. That is, the advertising cost associated with the transaction and the attendant risk that such advertising will be unsuccessful fall directly upon the seller. As a result, the offered cost of a product will normally include not only the cost of manufacturing the product and the seller's anticipated profit, but also the cost of advertising the product. Similar problems and associated risk exist when a seller offers services.

Accordingly, there is a need for an improved method and apparatus for offering goods and services, including within electronic sales systems, to reduce the risk placed on a seller. There is also a need for an improved method and apparatus for advertising goods and services, and reaching more buyers in a fast and economical fashion. Still further, there is a need to provide an improved method and apparatus for automatically and intelligently directing sale offers to particular types of buyers in order to increase the likelihood of acceptance of the sale offer.

SUMMARY OF THE INVENTION

The present invention breaks the traditional structural barriers normally existing between the marketing function and the selling function of an industrial or commercial enterprise. The invention also breaks the division between advertising (i.e., contacts, impressions, etc.) and selling goods (i.e. video cameras, shoes, plants, etc.) or services (i.e., airline tickets, telephone service, etc.). Further, with the present invention, the risk placed on a seller is substantially reduced.

A core feature of the invention is a sale offer that is electronically presented to a buyer through an Web site or electronic network at a substantially discounted price or for "free" (i.e., for free or a price near zero plus delivery charges-if applicable) for a very limited amount of time. That is, any registered consumer surfing a particular Web site at a certain point in time—the "minute"—will receive a free good. This minute (referred to hereinafter as a Happy Minute®) will appear on a random basis during the day, so that the consumer does not know when the Happy Minute® starts. As a result, consumers have an incentive to stay on the Web site.

Using the exemplary principles of the present invention, a substantial cost is created for the enterprise or seller. However, one should consider that the invention itself creates an ever increasing buyer traffic to the Web site which is highly marketable. The potential high revenues—whose amount will often be larger or above the seller's cost—are obtained by selling the associated buyer traffic to advertisers (i.e., through banners sales, etc.). As a result, the high costs of selling at a price zero or near to zero is covered by the sale of an increasing buyer traffic to an advertising space buyer.

A main distinction between the strategy of the present invention and the economic strategies of prior techniques for selling discounted goods or services, such as Web sites as Buy.com, is the fact that the latter is continuously selling goods or services with a discount (such as a 10% discount) while, under the present invention, the goods or services are, from a buyer's perspective, randomly offered for zero or a sum near to zero and for a very limited period of time.

Under the operative point of view, the present invention allows sellers of goods and services to communicate a binding sale offer to potential buyers, and to prospective buyers to positively respond to such an offer, immediately concluding a sales contract. In a preferred embodiment, the apparatus of the present invention includes a central controller which transmits a binding sale offer to an Web site or electronic network, making such an offer visible and available to a number of prospective buyers. Prospective buyers then have the possibility to accept the sale offer, and thus bind the corresponding seller to a contract. As indicated above, the method and apparatus of the present invention may be implemented through the Internet, as well as any other type of electronic network system or environment.

With the present invention, the risk placed on a seller is substantially reduced. The core of the invention is a sale offer that is electronically presented to a buyer through an Web site at a substantially discounted price or for "free" (i.e., for free or a price near zero plus delivery charges—if applicable) for a very limited amount of time. The cost of such a sale offer is very high for the owner or co-owner of the Web site, who is—economically speaking—the seller or a party who has entered into an agreement with a seller. However, because of the very unique nature of the sale offer of the present invention, a large number of buyers will crowd the Web site. Such a number of potential buyers is highly marketable, thus generating a substantial revenue for the owner or co-owner of the Web site.

In a preferred embodiment, the present invention provides a method and apparatus for the owner of an Web site who wish to acquire a seller's marketable traffic on their site through a particular sale offer. The sale offer is in itself highly valuable since it serves as an advertising tool for the offered product or service or the site itself and provides a valid technique for communicating a binding purchase offer globally to many potential buyers.

In one embodiment of this invention, communication between sellers and buyers is conducted using an electronic network and central controller. The Web site owner or co-owner who wishes to make an offer accesses the central controller located at a remote server. An administrator of the Web site will create a sale offer ("SO") by specifying the time limit within which a buyer can accept the offer, the subject of the good or service to put on sale, the good's or service's price, an acceptance form, and finally a payment identifier. Once the potential buyer has seen the announcement of the sale offer and wishes to accept it, the potential buyer registers to accept the sale offer. At the same time, the controller "records" that a buyer is going to complete the acceptance form and prevents the successive acceptance form(s) from disappearing within the previously stated time limit.

The central controller automatically sends the potential buyer a unique tracking number and an acceptance form to complete with personal data while the potential buyer is online with the central controller. After providing all the required statements of acceptance, the buyer transmits to the central controller the acceptance form. In accordance with the present invention, the acceptance form from the buyer can be transmitted via a World-Wide-Web (WWW) interface, electronic mail or voice mail, not excluding futures evolutions of the communications media which can provide "instant" or real-time communications between a seller and a buyer.

As soon as the central controller receives all the transmitted buyer data, together with the filled out acceptance form, the controller will transmit to the potential buyer a payment identifier together with a final statement of acceptance to be electronically signed by the buyer and filled out with credit card data or description of the cash or payment delivery form. After acceptance of this final form, the buyer transmits it online to the seller. The buyer and seller then become parties to a legally binding contract.

In accordance with an aspect of the invention, the central controller manages the payment system between the seller and the buyer by communicating and transmitting, for example, credit card data to the buyer's bank, for confirming the availability of necessary funds or credit and the validity of the credit card used. Finally, the central controller stores the payment, keeps track of it, and sends a reply to the buyer to notify the buyer of the payment receipt.

The present invention also allows a seller to reach a large number of remotely located buyers who normally reach a Web site and who would be interested in the seller's goods or services, those being related to the site's content and/or offered for a disproportionate price in comparison to their real market value.

It is a goal of the present invention to provide a Web site owner with a robust method and system to improve the capacity of traffic to the site and thereby improve the marketability of the site itself. In accordance with another embodiment of the invention, an industrial or commercial enterprise, owner or co-owner of an Web site, begins to input into its site a sale offer of goods and/or services of high quality priced at zero or nearly zero. The Web site's owner is not necessarily the producer or provider of such goods and services. In a preferred embodiment of the invention, the price for the good is zero plus delivery expenses or a trivial cost (e.g., one cent) plus delivery expenses (e.g., $52 dollars), the delivery cost being determined by the buyer's location.

The offer is transmitted to potential buyers through an Internet or Web site. Unpredictably, from the standpoint of the buyer, the offer will appear on the Web site's screen during the day. The central controller, which generates the sale offer, can also be programmed via a random function, so that nobody can predict when the sale offer will appear. This unpredictability also creates a heightened level of expectation because the availability of such an offer is extremely short in terms of time. That is to say, if the potential buyer does not enter the agreement process within a predetermined period of time (e.g., within a selected number of seconds, minutes, hours, weeks, etc.), the sale offer form disappears and is no longer available until a new sale offer appears. The potential buyer who starts to complete an acceptance form associated with the offer can be safeguarded from the disappearance of the same acceptance form. It is only necessary that the potential buyer does not leave the form. However, the acceptance form and the offer may be withdrawn if the potential buyer fails to complete the acceptance form within a predetermined period of time (e.g., within a selected number of seconds, minutes, hours, weeks, etc.).

It is easily understandable that, just because of the simple fact of offering goods or services of high quality (i.e., a video camera, a digital tape recorder, an airline ticket, telecommunication services or other goods and services) at a price near to zero, there should be a substantial traffic increase into the Web site which adopts the present invention. As a result of this traffic increase, revenue from advertising over the side itself will also increase. The increase in revenue can not only fully recover the cost for the above sale, but may render the web site largely profitable, as well.

The seller can also decide to repeat the offer during the day, the week, month or year, but this does not substantially change the basic mechanism or features of the invention. In addition, it is not necessary that goods or services offered be produced or provided by the offeror. Under the present invention, the offered items can serve as a support or stimulus for the purchase of the site's own different goods and services, and for the web site's economic life cycle.

BRIEF DESCRIPTION OF THE DRAWINGS

The accompanying drawings are included to provide a further understanding of the invention and are incorporated in and constitute a part of this specification. The drawings illustrate embodiments of the invention, and, together with the description, serve to explain the principles of the invention. In the drawings.

FIG. 7B illustrates another aspect of the features of an administrator page for use by the Web site's administrator;

FIG. 12 illustrates an exemplary embodiment of an administrator page showing that the central controller has received data from a personal entry data form and automatically having sent an acceptance form to the buyer;

DETAILED DESCRIPTION

Figure 1:
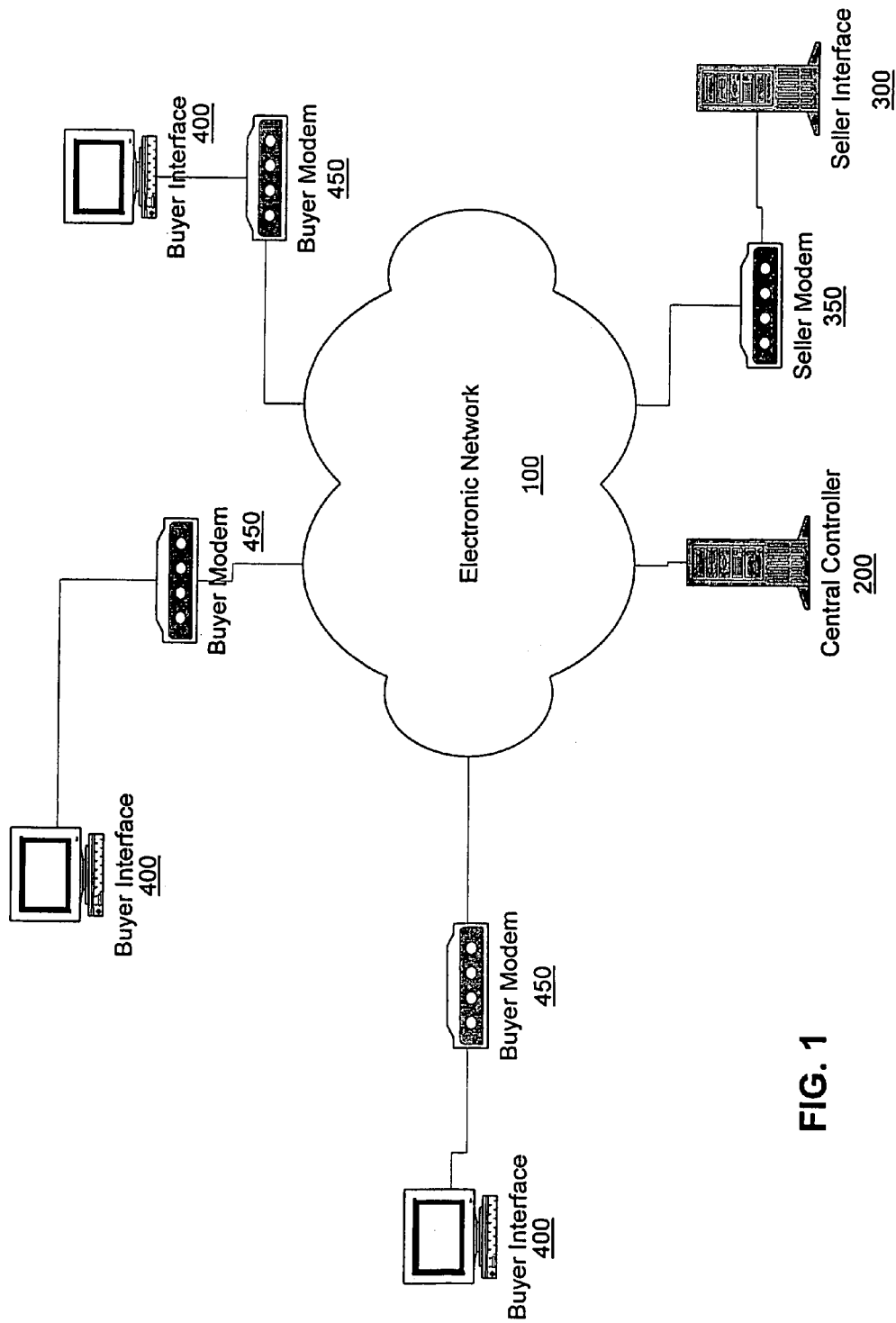
FIG. 1 illustrates an exemplary embodiment of a network environment for implementing the features of the present invention.

The present invention described herein may be implemented as logical operations in a network environment (such as, for example, the Internet) including computing systems, thin clients, low-end network stations and/or other types of terminals. The logical operations of the invention may be implemented through any suitable combination of hardware, software and/or firmware. For example, the features of the invention may be implemented: (1) as a sequence of computer implemented steps running on a computing system; and (2) as interconnected machine modules within a computing system. The implementation is a matter of choice that is dependent on the performance requirements of the computing system implementing the various features and aspects of the invention. Accordingly, the logical operations making up the aspects and embodiments of the invention described herein are referred to variously as operations, steps or modules.

In addition, the present invention relates to computer readable media that include program instructions for performing various computer-implemented operations. The media and programming instructions may be those specially designed and constructed for the purposes of the present invention, or may be of a kind well known and available to those having skill in the computer software arts. Examples of computer readable media include, but are not limited to, magnetic media, such as hard disks, floppy disks and magnetic tape; optical media such as CD-ROM disks; magneto-optical media, such as optical disks; and hardware devices that are specially configured to store and perform program instructions, such as read-only memory (ROM) and random access memory (RAM). Examples of program instructions include both machine code that can be produced by a compiler, and files containing higher level code that can be executed by a computer using an interpreter.

Generally, the present invention provides a method and apparatus for offering goods and services in an electronic network environment, such as, for example, the Internet. According to the various features and aspects of the invention, a seller who owns, co-owns or enters into an agreement with an owner of Web site, generates sales offers for one or more goods or services to visitors of the Web site, whereby such a visitor may accept and receive the goods or services at a deeply discounted price or at virtually no cost. In the context of goods offered by a seller, a visitor who accepts a sale offer (i.e., the buyer) may only be required, for example, to pay 0-1 cent, with or without delivery charges. Services offered by a seller may also be offered at a deeply discounted price or on virtually "free" basis. Since the goods or services are offered on a heaviliy discounted or free basis, the Web site hosting the sale offer will experience increased traffic or "hits" from visitors connected to the Internet. The sale offer, therefore, has value to the Web site owner by providing a means for increasing traffic or hits to the Web site, thereby increasing the value of the Web site and/or increasing e-commerce conducted through the site. The sale offer also provides value to the seller in the form of an effective means for advertising goods or services over the Internet.

In order to increase and/or maintain the number of visitors to a Web site, the goods or services that are offered over the Web site may be offered at unpredictable or random times. For example, a system administrator may select one or more times during a specific date on which the sale offer is to be made on the Web site. The time(s) at which the sale offer is selected by the system administrator may be kept secret from Web site visitors so as to make the offer "unpredictable". Alternatively, a system administrator may program a central controller module for the Web site, such that a sale offer is provided at one or more random times determined by the controller. The "randomness" of the sale offer will also increase and peak interest in the Web site, as visitors link to and/or browse the Web site in anticipation of the sale offer being displayed or communicated through the Web site.

When providing a sale offer, each sale offer may be made available to all buyers that are presently visiting the Web site and exchanging information with the Web server or central controller. In some cases, the capacity of the Web server or central controller may be limited so that only a predetermined number of buyers (e.g., 200 buyers) can receive the sale offer at any given instant. Alternatively, a limited number of sale offers (not necessarily restricted by the capacity of the server or controller) may be provided to buyers visiting and exchanging information with the Web site when the offer is to be made. In such a case, the sale offer may expire prior to the duration or period of the offer, if all of the predetermined sale offers have been accepted by buyers who received the offer through the Web site. It is also possible to target particular buyers, so that only buyers who have a certain profile or other type of identifier that matches a predetermined profile or identifier selected by the seller can actually receive a sale offer. With such a targeted approach, the seller may target specific types of buyers with the sale offer.

In one embodiment of the present invention, communication between sellers and buyers is conducted using an electronic network and central controller. In a preferred embodiment, the electronic network comprises the Internet. Potential buyers can access the Internet through a variety of devices, such as through a personal computer, an interactive TV device, a wireless phone, a personal digital assistant (PDA) or any other communication device. On the other hand, the Web site owner or seller who wishes to make an offer may access a central controller, which may be implemented through a server, computing system or module connected to the Internet, through a direct dial-up connection or over the Internet though an Internet service provider, for example. Through the central controller, a system administrator for the seller will create a sale offer ("SO") by specifying the subject of the good or service to be placed on sale, the good's or service's price, the limited time period during which a buyer can accept the offer, an acceptance form, and finally a payment identifier.

Once the potential buyer has seen the announcement of the sale offer and wishes to accept it, the buyer can register through the Web site to accept the sale offer. At the same time, the central controller "records" that a buyer is going to complete an acceptance form and prevents the acceptance form from disappearing within the predetermined time limit or period.

According to an aspect of the invention, the central controller may automatically send the potential buyer a unique tracking number and an acceptance form to fill out with personal data while the buyer is online with the central controller. After filling all the required statements of acceptance, the buyer transmits to the central controller the acceptance form. Under the present invention, the acceptance form can be transmitted via a World-Wide-Web (WWW) interface, electronic mail or voice mail, not excluding further or future evolutions of communications technology and media, which will provide "instant" or real-time communication between the buyer and the seller.

As soon the controller receives all the transmitted buyer data, together with the filled out acceptance form, the central controller transmits the potential buyer a payment identifier together with a final statement of acceptance to be electronically signed by the buyer and filled out with credit or debit card data or a description of a cash delivery form. After acceptance of this last form, the buyer transmits it online to the seller. The buyer and seller are now parties to a legally binding contract.

The central controller manages the payment system between the seller and the buyer and transmits the credit or debit card data to the buyer's bank, for confirmation of fund availability and/or card validity. Finally, the central controller stores the payment, keeps track of it, and sends a reply to the buyer to ensure him/her of receipt of the payment receipt.

The present invention also allows sellers to reach a large number of remotely located buyers who normally reach an Web site and who would likely be interested in goods and services, those being related to the site's content and offered for a disproportionately priced in comparison to their real market value. The present invention also provides a Web site owner with a robust system to improve the capacity of traffic in the site, which is highly marketable.

As discussed above, the operating environment in which the present invention can be used encompasses network environments (such as the Internet), wherein general purpose computers, workstations, personal computers, network computers, thin clients, low-end network stations, interactive TV devices, wireless phones, personal digital assistants (PDA) and other types of terminals or devices are connected through communication links of various types, and wherein information objects (including applications, programs, data, images, etc.) are made available by and through various members of the network environment.

Exemplary interfaces and a system architecture for implementing the various features and aspects of the invention, in accordance with a preferred embodiment, will now be described with reference to FIGS. 1-4.

As illustrated in the exemplary network environment of FIG. 1, the present invention may include a seller interface 300, a central controller 200 and one or more buyer interfaces 400 (collectively referred to as "nodes"). Direct connections or links may be provided between these nodes or communication between the nodes may be facilitated by an electronic network 100 (as shown in FIG. 1). In the later case, each node may be connected to the Internet or another suitable network environment using, for example, a modem (such as seller Modem 350 or buyer Modem 450) and a public switched phone network, such as those provided by a local or regional telephone operating company. Other type of network connections are also feasible, such as those facilitated by cable, satellite links, and other types of wired or wireless links. Seller interface 300 and buyer interface 400 provide input and output gateways for communications with central controller 200. One or more seller interfaces or buyer interfaces may be connected to each central controller.

Using the above-noted components, the present invention provides a method and apparatus to transmit a sale offer available to all potential buyers who are connected to a Web site adopting the features of the invention, and allow each buyer to accept the offer to form a legally binding contract with the seller.

Figure 2:
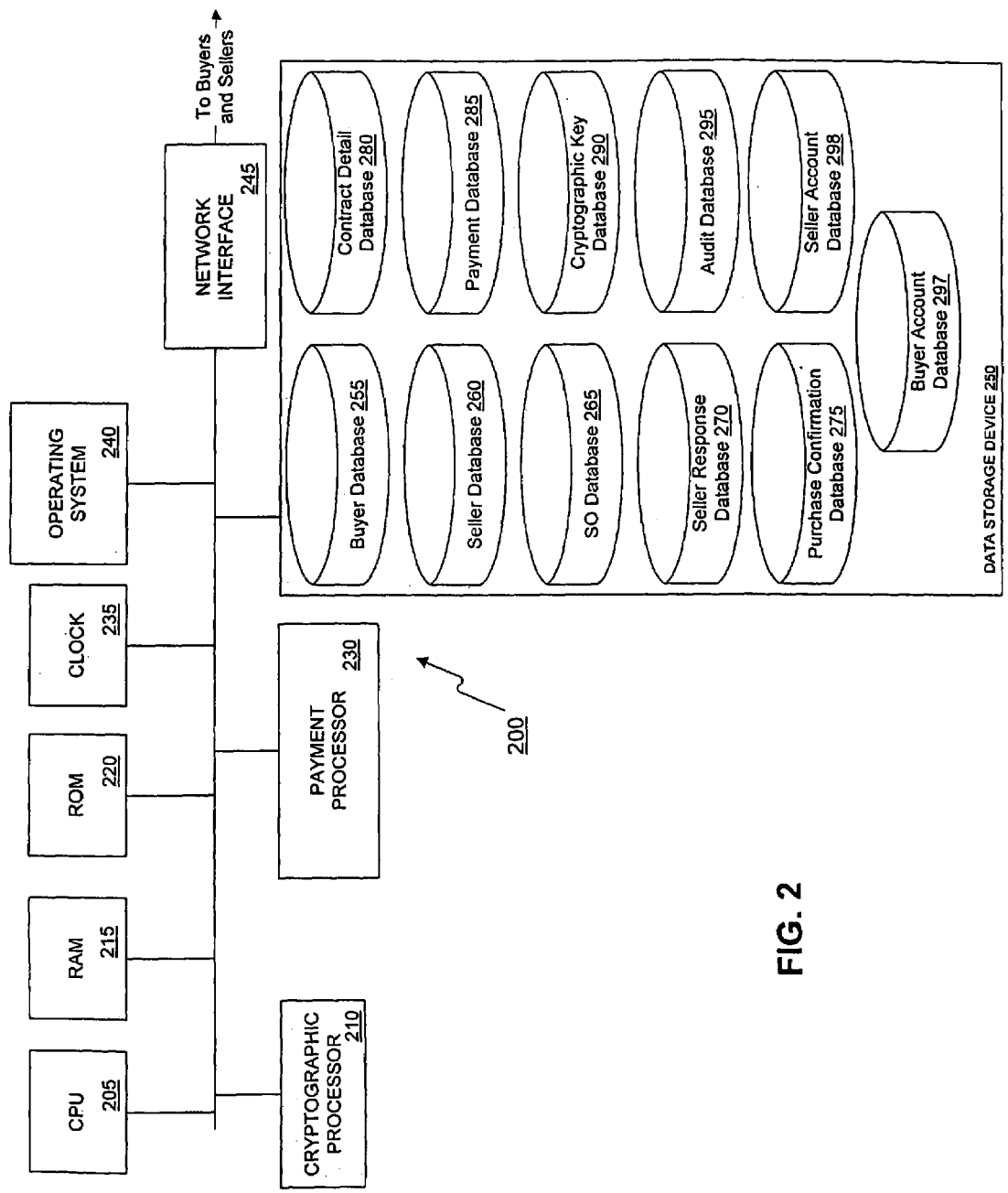
FIG. 2 is a block diagram showing an embodiment of a central controller, consistent with the principles of the invention.

As shown in FIG. 2, central controller 200 may include a central processor (CPU) 205, a cryptographic processor 210 (e.g., alternatively referred to as an encryption processor), a RAM 215, a ROM 220, a payment processor 230, a clock 235, an operating system 240, a network interface 245, and data storage device 250. A conventional personal computer, computer workstation and/or server with sufficient memory and processing capability may be used to implement the various components of central controller 200. In accordance with one embodiment of the invention, central controller 200 operates as a Web server or host of the Web site incorporating the features of the invention, both transmitting sale offers generated by the seller and receiving acceptance forms completed by each buyer. Central controller 200 must be capable of reasonable speed for high volume transaction processing, performing a significant number of mathematical calculations in processing communications and database storage. A Pentium processor or higher generation of processor manufactured by Intel may be used for CPU 205, that employs, for example, a 32-bit architecture. Comparable processors include Motorola 120 MHz Power PC 604 or Sun Microsystem 1660 MHz Ultra SPARC-I, for example. In addition, a microcontroller, such as a MC68HC16 currently manufactured by Motorola may be used as encryption processor 210. This type of microcontroller uses a 16-bit multiply-and-accumulate instruction in the 16 MHz configuration and requires less than one second to perform a 512-bit RSA private key operation. Equivalent microprocessors or more powerful microprocessors may also be used. Cryptographer processor 210 supports the authentication of communications between the seller and one or more buyers.

Referring again to FIG. 2, payment processor 230 comprises one or more conventional microprocessors (such as an Intel Pentium) supporting the transfer and exchange of payments, charges or debits, attendant to the features of the invention. Payment processor 230 may also be configured as part of CPU 205. Processing of, for example, credit card transactions by payment processor 230 may be supported with commercially available software, such as the Secure Web server manufactured by Open Market Inc. This server software transmits credit card numbers electronically over the Internet to servers located at the Open Market headquarters where card verification and processing is handled. The Integrated Commerce Service of Open Market provides back-office services necessary to run Web-based businesses. Services include on-line account statements, order-taking and credit card payment authorization, credit card settlement, automated sales tax calculations, digital receipt generation, account-based purchase tracking, and payment aggregation for low-priced goods or services. Other types of credit card transaction processing systems, services, software and/or networks may also be used in conjunction with the present invention.

Data storage device 250 may include hard disk magnetic or optical storage units, as well as CD-ROM drives or flash memory. Data storage device 250 contains databases used in the processing of transactions in the present invention, including buyer database 255, seller database 260, sale offer (SO) database 265, seller response database 270, purchase confirmation database 275, contract detail database 280, payment database 285, cryptographic key database 290, and audit database 295. In a preferred embodiment database software, such as Oracle7, manufactured by Oracle Corporation, is used to create and manage these databases. Data storage device 250 also stores information pertaining to buyer account 297 and seller account 298.

Buyer database 255 maintains data on buyers, by providing a number of fields, such as name, address, credit card number, phone number, ID number, social security number, electronic mail address, credit history, past system usage, public/private key information, etc. This information is obtained when a buyer first registers with the system, completing the acceptance form for the sale offer, referred to as "SO." Buyer database 255 also contains the tracking number of each acceptance form filled out by the buyer, and the tracking number for the sale offer. Seller database 260 maintains data on sellers with fields, such as name, contact information, public/private key information, payment preferences, type of business, and goods or services sold. Contact information comprises a phone number, Web page URL, bulletin board address, pager number, telephone number, electronic mail address, voice mail address, facsimile number, or any other way to contact the seller.

SO database 265 tracks all sales offers fields, such as status, tracking number, date, time, article, price, expiration date, conditions, and buyer identification number. This database is valuable in the event of disputes between buyers and sellers regarding payment, because details of the contract can be produced. SO database 265 may also store bond certificate and other related information.

Seller response database 270 tracks all sales offer and/or seller responses with various fields, such as seller name, seller ID number, date, time, seller response tracking number, and associated sales offer tracking number.

Purchase confirmation database 275 tracks messages sent between the buyer and seller confirming completed transactions (bound contracts). Fields include buyer name, buyer ID number, seller name, seller ID number, purchase confirmation tracking number, and associated sale offer tracking number.

Payment database 285 tracks all payments made by buyers by means of fields, such as buyer name, buyer ID number, amount of payment, and associated sale offer tracking number. This database may also store credit card numbers of buyers.

Cryptographic or encryption key database 290 facilitates cryptographic functions, storing both symmetric and asymmetric keys. These keys are used by cryptographic processor 210 for encrypting and decrypting buyer credit card number and date of expiration.

Audit database 295 stores transactional information relating to the transmission of each sale offer, allowing it to be retrieved for later analysis.

Buyer account 297 tracks all information pertaining to the buyer's account with fields, such as buyer's name, bank and credit account numbers, and debit transactions.

Seller account 298 tracks all information pertaining to the seller's account with fields such as seller's name, bank and credit account numbers, and debit or credit transactions. Buyer payments for a sale offer may be sent to this account database.

Network interface 245 is the gateway to permit central controller 200 to communicate with buyers and sellers through respective buyer interface 400 and seller interface 300. Conventional internal or external modems may serve as network interface 245. Network interface 245 supports modems at a range of baud rates from 1200 upward, but may combine such inputs into a T1 or T3 line if more bandwidth is required. In a preferred embodiment, network interface 245 is connected with the Internet and/or any commercial on-line service such as America Online, CompuServe, or Prodigy, allowing buyers and sellers to have access from a wide range of on-line connections. Several commercial electronic mail servers also include the above functionality. Network interface 245 may be configured as a voice mail interface, Web site interface, BBS, or electronic mail address.

While the above embodiment describes a single platform acting as central controller 200, those skilled in the art will realize that the functionality can be distributed over a plurality of computers or platforms. In one embodiment, central controller 200 is configured in a distributed architecture, wherein the databases and processors are housed in separate units or locations. Some controllers perform the primary processing functions and contain at a minimum RAM, ROM, and a general processor. Each of these controllers is attached to a WAN hub which serves as the primary communication link with the other controllers and interface devices. The WAN hub may have minimal processing capability itself, serving primarily as a communications router. Those skilled in the art will appreciate that an almost unlimited number of controllers may be supported. This arrangement yields a more dynamic and flexible system, less prone to catastrophic hardware failures affecting the entire system. Such a trusted server embodiment provides a distributed environment, including a server, a trusted server and a bonding agency. The hardware of these servers would be configured similarly to that described for central controller 200.

Figure 3:
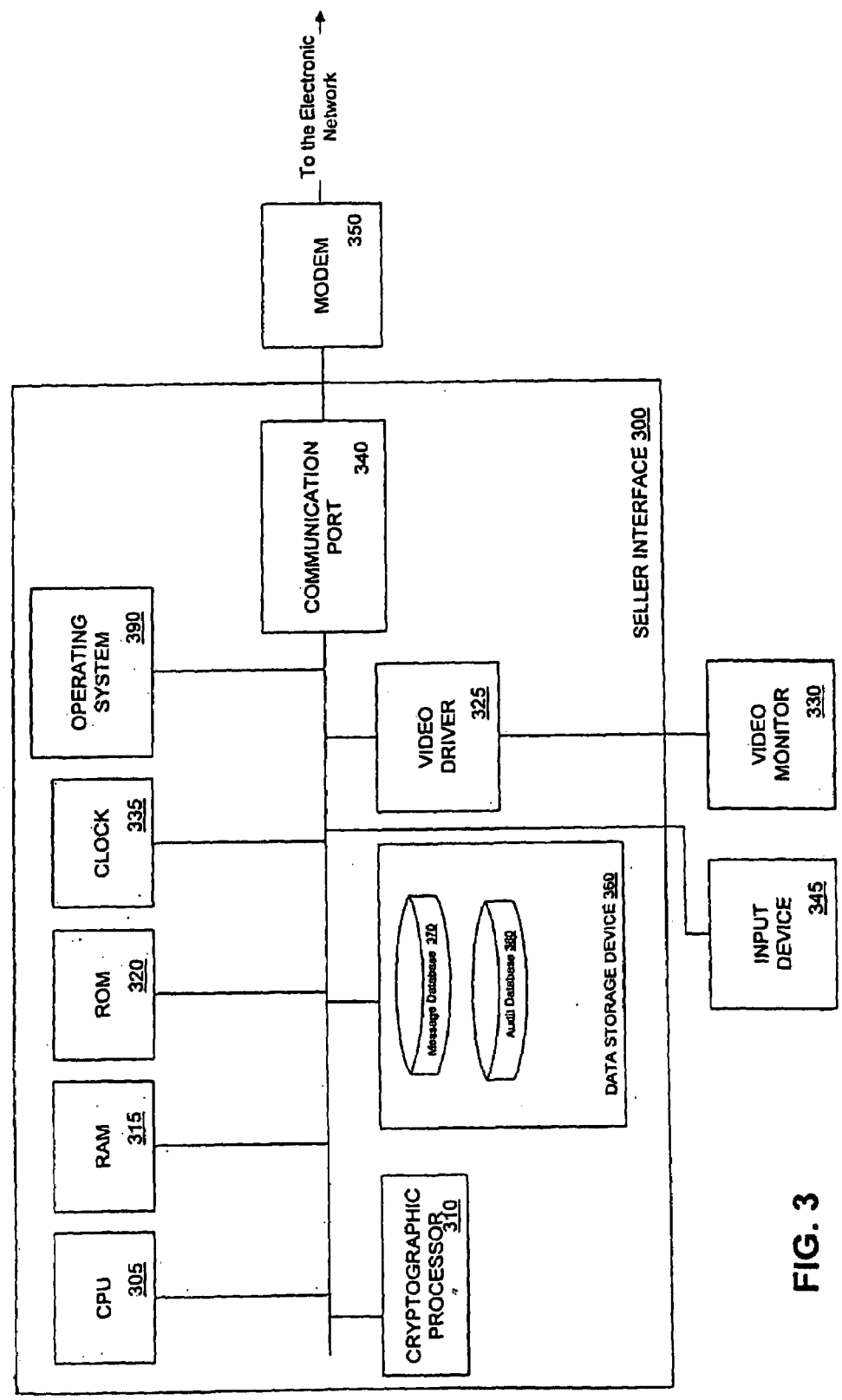
FIG. 3 is a block diagram showing an embodiment of a seller interface, consistent with the principles of the invention.
Figure 4:
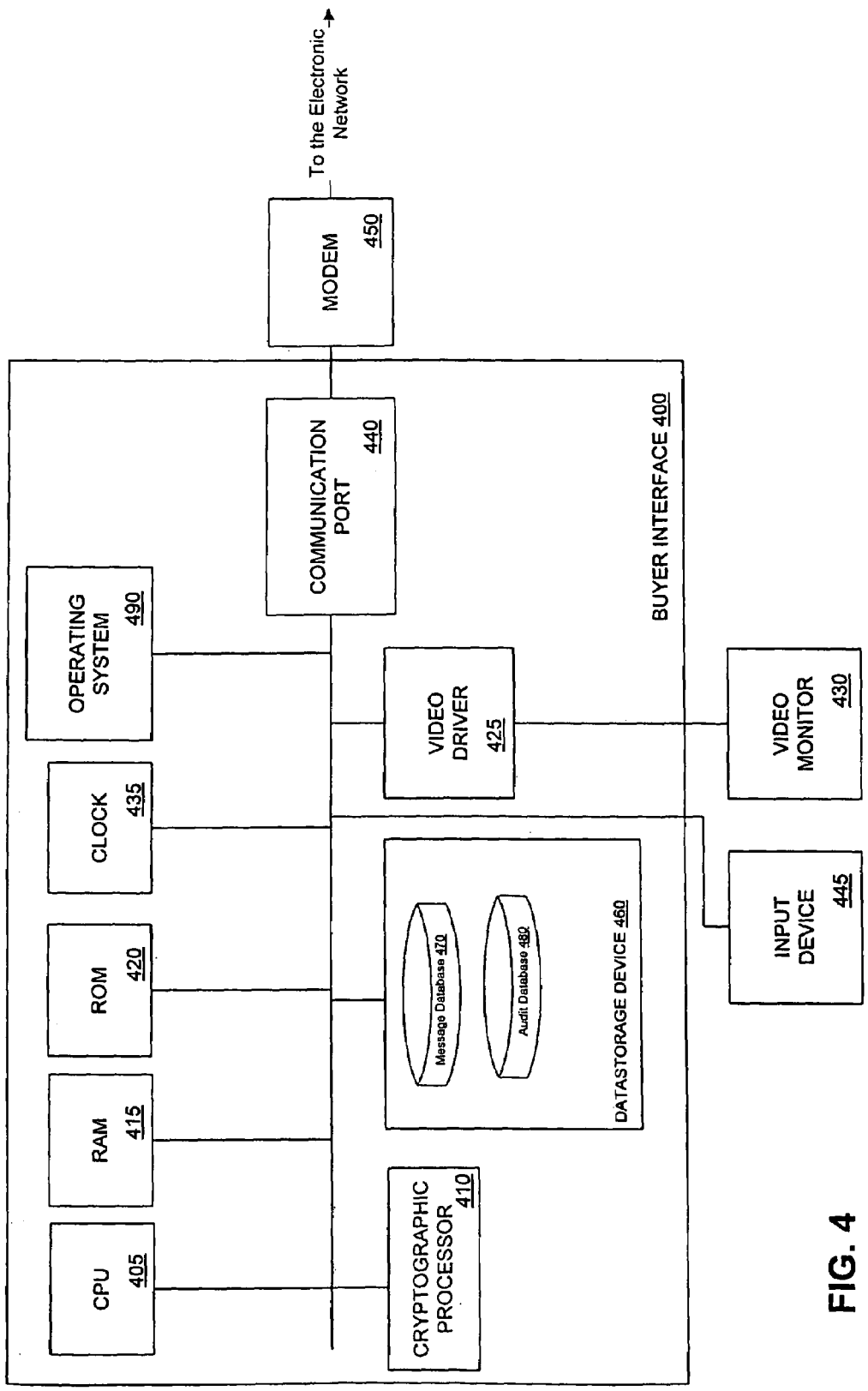
FIG. 4 is a block diagram showing an embodiment of a buyer interface, consistent with the principles of the invention.

FIG. 3 illustrates the features of an exemplary seller interface 300 and FIG. 4 illustrates the features of an exemplary buyer interface 400. In an exemplary embodiment, seller interface 300 and buyer interface 400 are both conventional personal computers having an input device, such as a keyboard, mouse, or conventional voice recognition software package; a display device, such as a video monitor; a processing device such as a CPU; and a network interface such as a modem. These devices interface with central controller 200, either directly or through a network environment (such as the Internet).

As shown in FIG. 3, seller interface 300 includes a central processor unit (CPU) 305, a RAM 315, a ROM 320, a clock 335, a video driver 325, a video monitor 330, a communication port 340, an operating system 390, an input device 345, a modem 350, and a data storage device 360. A Pentium microprocessor, such as the 100 MHz P54C described above, may be used for CPU 305. Clock 335 is a standard chip-based clock which can serve to timestamp a seller response or communication produced by seller interface 300. Modem 350 does not necessarily require high-speed data transfer because most seller responses or communications are text-based and not long.

As further shown in FIG. 3, seller interface 300 also includes a data storage device 360. Data storage device 360 includes a message database 370 and audit database 380 and may be configured with a conventional magnetic-based hard disk storage unit, such as those manufactured by Conner Peripherals. Message database 370 may be used for archiving seller responses or communications, while audit database 380 may be used for recording payment records and communications with central controller 200 or buyer interface 400.

As shown in FIG. 4, buyer interface 400 includes a central processor unit (CPU) 405, a RAM 415, a ROM 420, a clock 435, a video driver 425, a video monitor 430, a communication port 440, an operating system 490, an input device 445, a modem 450, and a data storage device 460. A Pentium microprocessor, such as the 100 MHz P54C described above, may be used for CPU 405. Clock 435 is a standard chip-based clock which can serve to timestamp a buyer response or communication produced with buyer interface 400. Modem 450 may not require high-speed data transfer because most buyer responses or communications are text-based and not long. Data storage device 460 includes a message database 470 and an audit database 480, and may be configured with a conventional magnetic-based hard disk storage unit, such as those manufactured by Conner Peripherals. Message database 470 may be used for archiving messages or other communications, and audit database 480 may be used for recording payment records and communication with central controller 200 or seller interface 300.

There are many commercial software applications that can enable the communications required by seller interface 300 or buyer interface 400, the primary functionality being message creation and transmission. Eudora Pro manufactured by Qualcomm incorporated, for example, provides editing tools for the creation of messages as well as the communications tools for routing a message to the appropriate electronic address. When central controller 200 is configured as a Web server, conventional communications software, such as the Netscape Navigator Web browser from Netscape Corporation, may also be used. For example, the buyer and seller may use the Netscape Navigator browser or another type of browser to transmit or accept sale offers, seller responses, buyer response or counteroffers (if applicable). Moreover, the buyer and seller may be required to use proprietary software to generate or receive such sale offers.

In general, communications relating to the sale offers take place via an electronic network such as the Internet, with central controller 200 acting as a Web server that hosts one or more Web sites. Each Web site may be owned by, or operated for, the benefit of a particular seller of goods or services. Web sites may also be provided that are owned by or operated for the benefit of a third party. In such cases, the Web site may provide information related to the goods or services of the seller and/or routinely offer the goods or services of the seller. As indicated above, the sale offers of the present invention are electronically presented on a Web site for viewing and acceptance by a buyer visiting the site when the sale offer is made. The generation of the sale offers may be controlled by the central controller 200 so that the offers appear at unpredictable times during the day on the Web site. The quantity and type of goods or services that are offered may be set according to communications or instructions received from the seller. The seller may also designate the frequency and period of time during which each sale offer is presented. Responses from buyers and/or the results of the sale offers may be collected by the central controller 200 and communicated to the seller. Communications between the buyer and seller may also be supported through the electronic network environment of the invention to facilitate the completion of the sale of the goods or services and/or to permit additional promotions or offers to be communicated from the seller to the buyer.

Referring to FIGS. 5 through 21, exemplary graphical user interfaces will be described to demonstrate the principles of the invention. Moreover, reference will be made to the exemplary flow charts of FIGS. 22-24 to describe how sale offers are generated, accepted and completed. Although the embodiments of FIGS. 5-24 illustrate the manner in which a sale offer may be generated and accepted for particular types of goods, the present invention is not limited to the presentation of the goods shown or to sale offers for goods in general. Instead, the invention also relates to sale offers for services and may be readily adapted for generating sale offers for any type of service offered by a seller.

Figure 24:
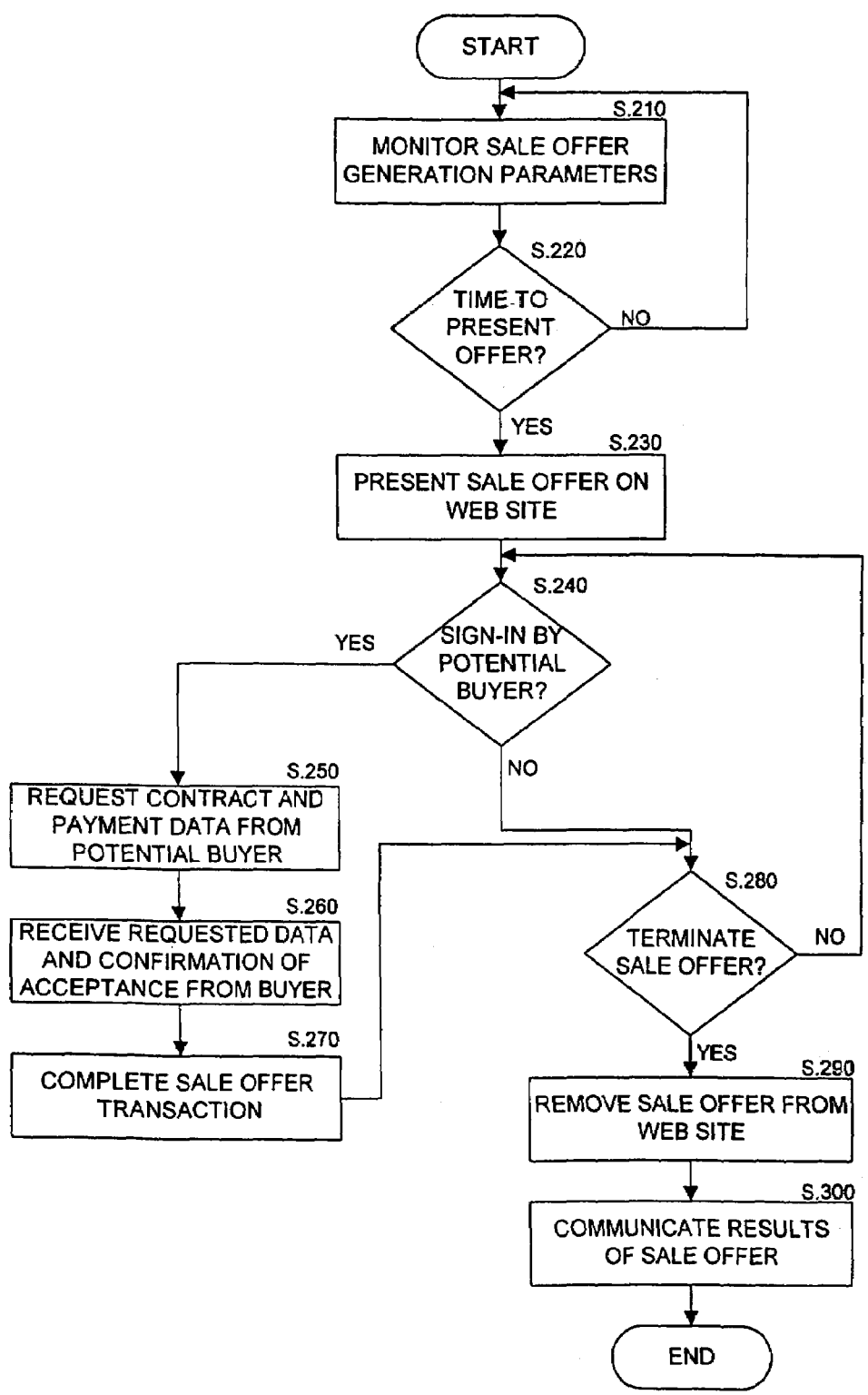
FIG. 24 is an exemplary flow chart illustrating the processes and operations for generating and accepting a buyer's response to sale offers, consistent with the principles of the present invention.

FIG. 24 is an exemplary flow chart illustrating the features and operations for generating and accepting sale offers, in accordance with the principles of the present invention. Generally, as shown in FIG. 24, the process begins by the central controller monitoring the parameters that define when and how the sale offer is generated on the Web site (S.210). As disclosed herein, these parameters may include the frequency and duration during which the sale offer is to be presented on the Web site during a given day. For example the sale offer generation parameters may define the specific time(s) when the sale offer is to be presented, or they may simply indicate the number of offers to be presented per day, with the exact time for generating each offer being randomly selected by the central controller. The sale offer generation parameters may also indicate how long each sale offer is to be presented on the Web site and whether to terminate the sale offer if a potential buyer does not provide sufficient data or does not confirm acceptance of the sale offer within a predetermined time period. Other parameters concerning each sale offer may also be stored and monitored by the central controller, including the quantity and/or type of goods to be offered, and the price (if any) and sale terms for the offer.

While monitoring the sale offer generation parameters, the central controller determines when it is time to present the sale offer on the Web site (S.220). If the central controller determines that it is time to present the sale offer (S.220; Yes), then the sale offer is electronically presented on the Web site according to the parameters (S.230). As indicated above, the time to generate the sale offer may be predefined by the sale offer generation parameters or randomly triggered by, for example, an internal clock of the central controller. When it is time to present a sale offer, the central controller may alter the displayed content on the Web site such that the terms of the sale offer appear in a separate pop-up screen or window, or a banner area on the Web site. If, however, the central controller determines that it is not time to present the sale offer (S.220; No), then the sale offer is not generated and the central controller continues to monitor the sale offer generation parameters (S.210).

After presenting the sale offer on the Web site (S.220), the central controller will monitor which users that are connected to the Web site have responded to the sale offer and requested to sign-in for more information on the offer. In other words, the central controller will determine when a potential buyer has decided to sign-in for the sale offer (S.240). When there is a sign-in by a potential buyer (S.240; Yes), the central controller will then request contract and payment data from the potential buyer (S.250). The contract data may include the name and address of the potential buyer. The payment data may include payment terms or instructions, such as credit card information or confirmation of cash payment on delivery. The request for the contract and payment data may be displayed through one or more windows or pop-up screens on the Web site. These windows or screens may also include more detail concerning the goods or services offered, as well as the specific terms of the sale offer. In addition, these windows or screens may request the potential buyer to confirm acceptance of the sale offer and, thus, form a legally binding contract with the seller.

In response to the request from the central controller, the potential buyer may provide the requested data and confirm acceptance of the sale offer through their interface to the electronic network environment. The central controller will then receive the requested data and confirmation from the buyer (S.260). This information may be stored and/or verified by the central controller in order to complete the sale offer transaction with the buyer (S.270). For example, the central controller may verify that all of the necessary data (such as name, address, etc.) and the confirmation of the acceptance was collected by the buyer. The central controller may also verify the payment terms or instructions (such as a valid credit card number) before completing the transaction with the buyer. If all necessary is verified by the central controller, then the confirmation may be sent to the buyer with, for example, a tracking or reference number in order to complete the transaction. The central controller may also post or issue a purchase and delivery order with the buyer's data, so that the purchased goods are delivered in a timely fashion by one or more agents.

In the event that the potential buyer does not accept the terms of the sale offer or fails to provide the requested data and confirmation to the central controller, then the sign-in process with the potential buyer may be terminated. For this purpose, the potential buyer may be given the option to leave the sign-in process by entering an appropriate response (e.g., clicking a designated icon on the screen). The exemplary process described in the flow chart of FIG. 24 may also be modified to permit termination of the sign-in process with the potential buyer if other conditions are present. For example, the sign-in process may be terminated if improper data is entered by the potential buyer or if the data entered by the buyer can not be verified (such as an unconfirmed credit card number).

Referring again to FIG. 24, the central controller monitors and responds to each potential buyer that has decided to sign-in for the sale offer (S.240). Since the sale offer of the present invention is preferably displayed for only a limited time, the central controller may also monitor and determine when to terminate the sale offer (S.280). This determination may be performed by the central controller based on the stored, sale offer parameters. A sale offer may be terminated or removed from the Web site when, for example, the defined time duration for the offer has expired. A sale offer may also be terminated if the quantity of goods to be offered has been depleted (i.e., all of the inventory of available goods has been purchased by buyers).

If the central controller determines that sale offer should be terminated (S.280; Yes), then the sale offer is removed from the Web site by central controller (S.290). During this step, the central controller may update the content on the Web site to replace or redisplay content (such as banner ads or other portions of the Web site) that were displaced by the sale offer. After removing the sale offer, the central controller may analyze the results of the sale offer and communicate the same to the seller or Web site owner (S.300). These results may indicate, for example, the response level to the sale offer and general information about the buyers that responded to the offer.

Figure 5:
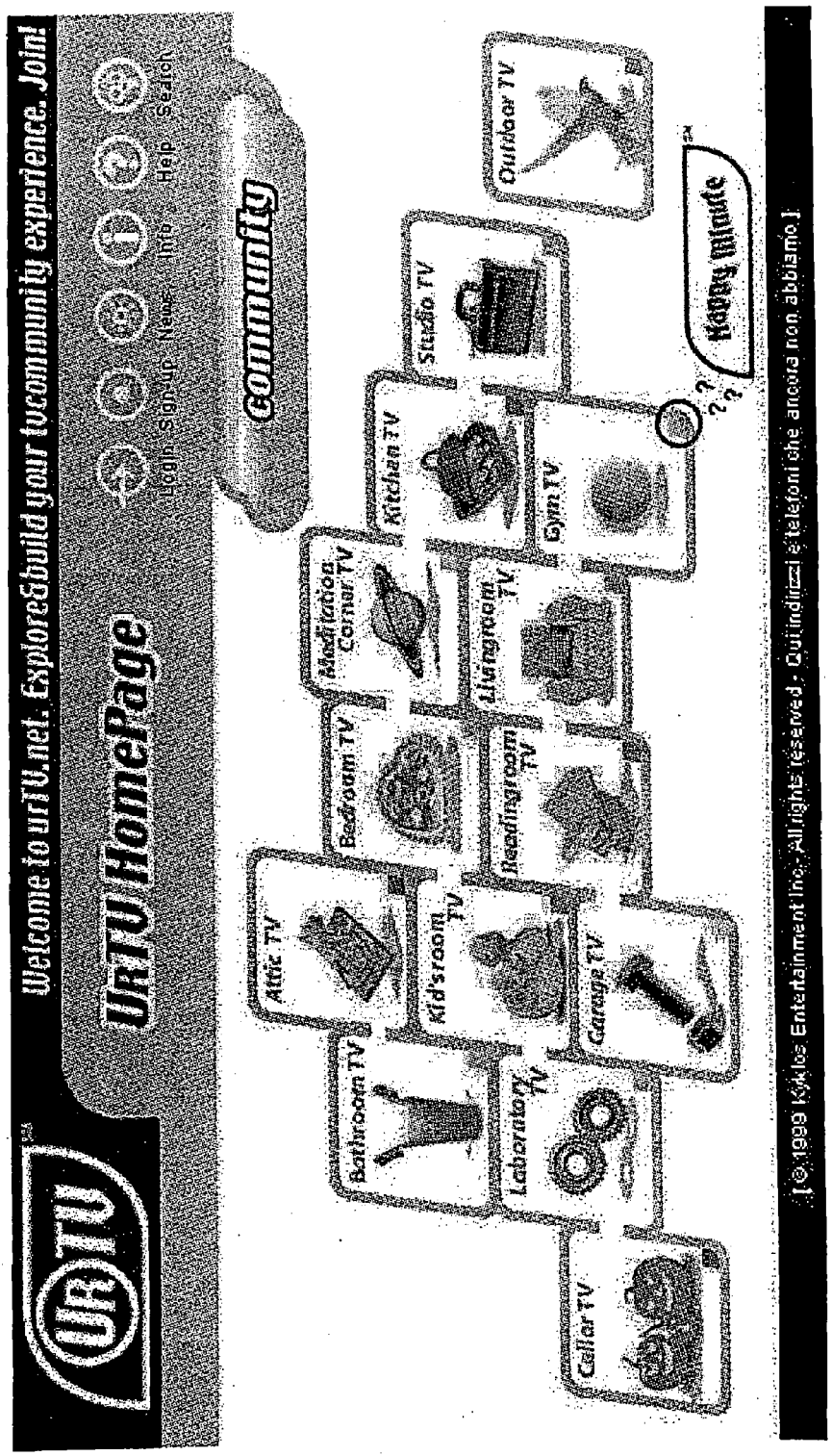
FIG. 5 illustrates an embodiment of a Web site's homepage before a sale offer is transmitted from the central controller, consistent with the principles of the invention.
Figure 22:
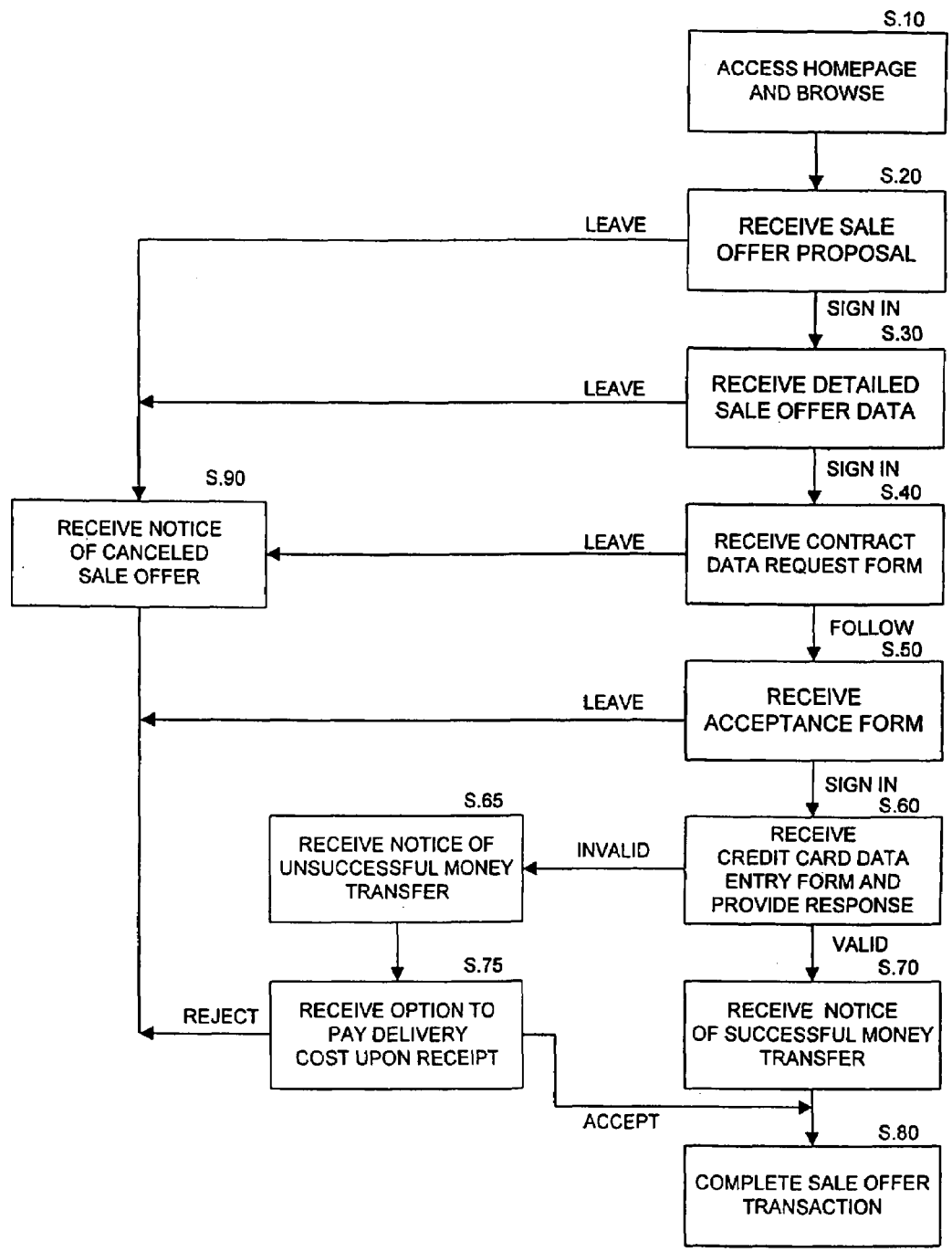
FIG. 22 is an exemplary flow chart illustrating how a potential buyer interacts with a seller to view and accept sale offers.

In accordance with the principles of the invention, FIG. 22 is an exemplary flow chart that illustrates how a potential buyer interacts with the central controller or seller to view and accept sale offers. In particular, as shown in FIG. 22, potential buyers may visit a particular Web site and browse the site. The Web site may be owned by the seller or may be owned by a third-party that provides information or regularly offers the goods or services of the seller. In either case, the Web site (such as that shown in FIG. 5) may contain any number of buttons or icons in the form of letters or symbols displayed on the buyer interface. Some icons can represent a particular type of room or page that displays a particular category of information. For example, as shown in the embodiment of FIG. 5, icons, here depicted as "rooms" involving different categories of information may include a Kidsroom TV, a Garage TV, a Kitchen TV or a Gym TV. Although the illustrated embodiment of FIG. 5 is shown with a finite number of particular content based rooms, any number of different types of rooms may be utilized. Other icons, such as an icon labeled "Happy Minute®," can be included to provide information about the sale offer system.

Figure 6:
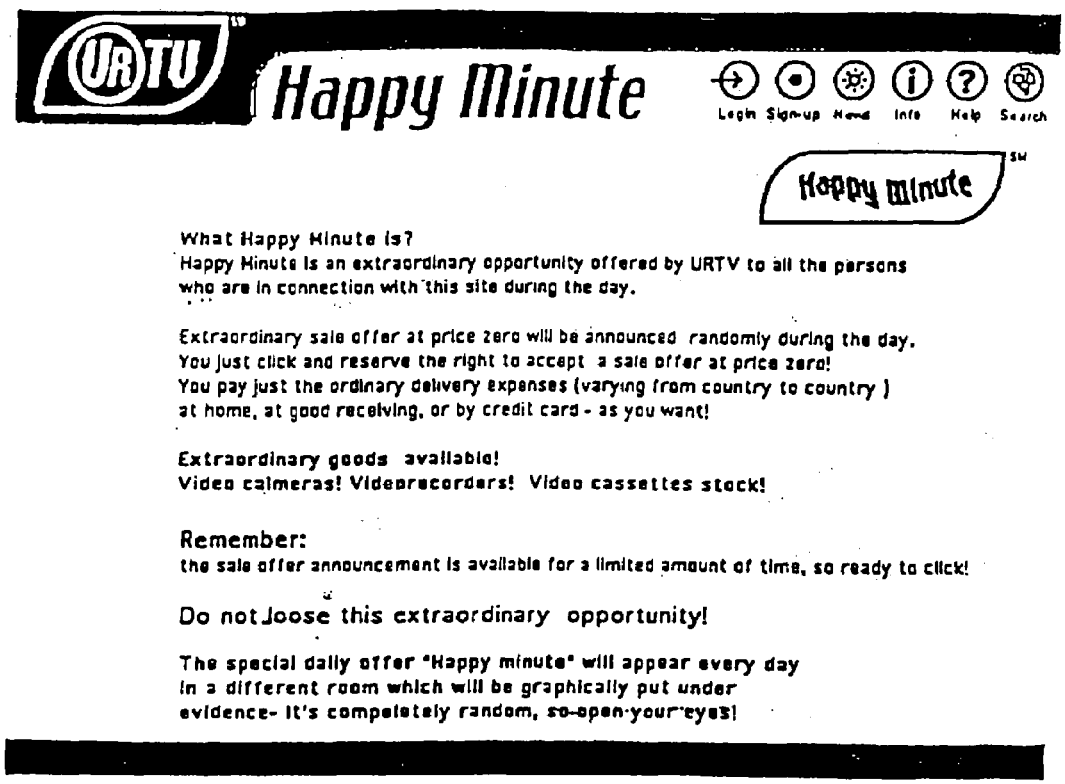
FIG. 6 illustrates an embodiment of a Web site's information page about a sale offer.

In order to find out how the sale offer system operates, a potential buyer may simply click on a predetermined icon (such as the "Happy Minute®" or "Info" icon) to visit a sale offer information page. As illustrated in the embodiment of FIG. 6, for example, the sale offer information page may include general information and describe a number of important aspects of the sale offer system. For instance, the sale offer information page may indicate that conditional purchase offers (i.e., sale offers) can be made at any time and at any location of the Web site. Moreover, the sale offer information page provides important terms of the sale offer. In particular, as illustrated in the embodiment of FIG. 6, a sale offer includes an offer to sell a product or service at a price of "zero," so long as the buyer pays the cost of delivery or associated fees. Other purchase price and/or terms of sale may also be displayed to potential buyers, such as the requirement that the buyer must accept a sale offer within a limited period of time. Additionally, the sale offer information page may include links or display any other kind of information, such as a visual or audio display of the types of products that will be offered and the number of products that have yet to be offered.

Figure 8:
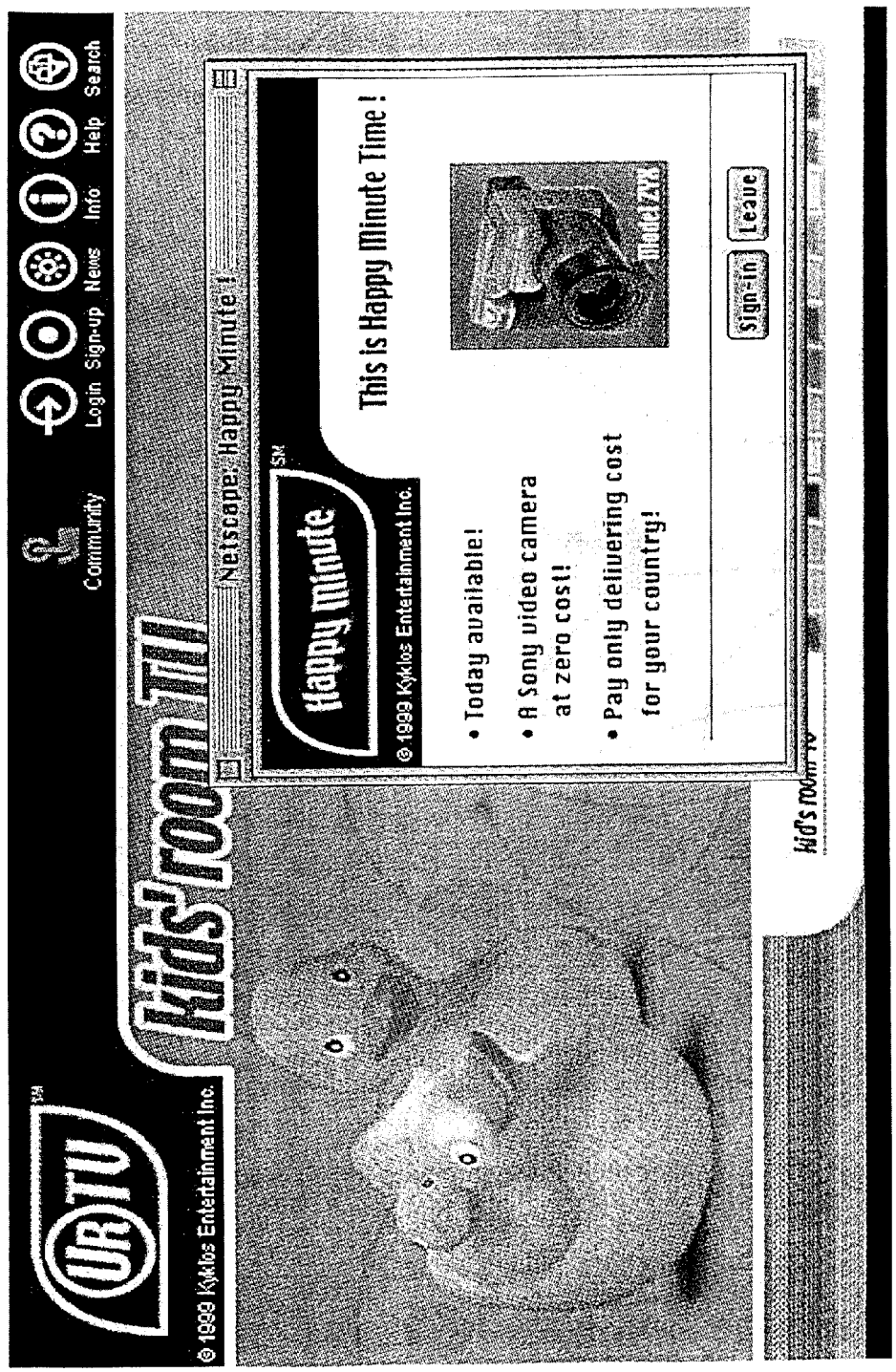
FIG. 8 illustrates an exemplary embodiment of a sale offer announcement appearing in any one or all of the Web site's pages for viewing by potential buyers.
Figure 9:
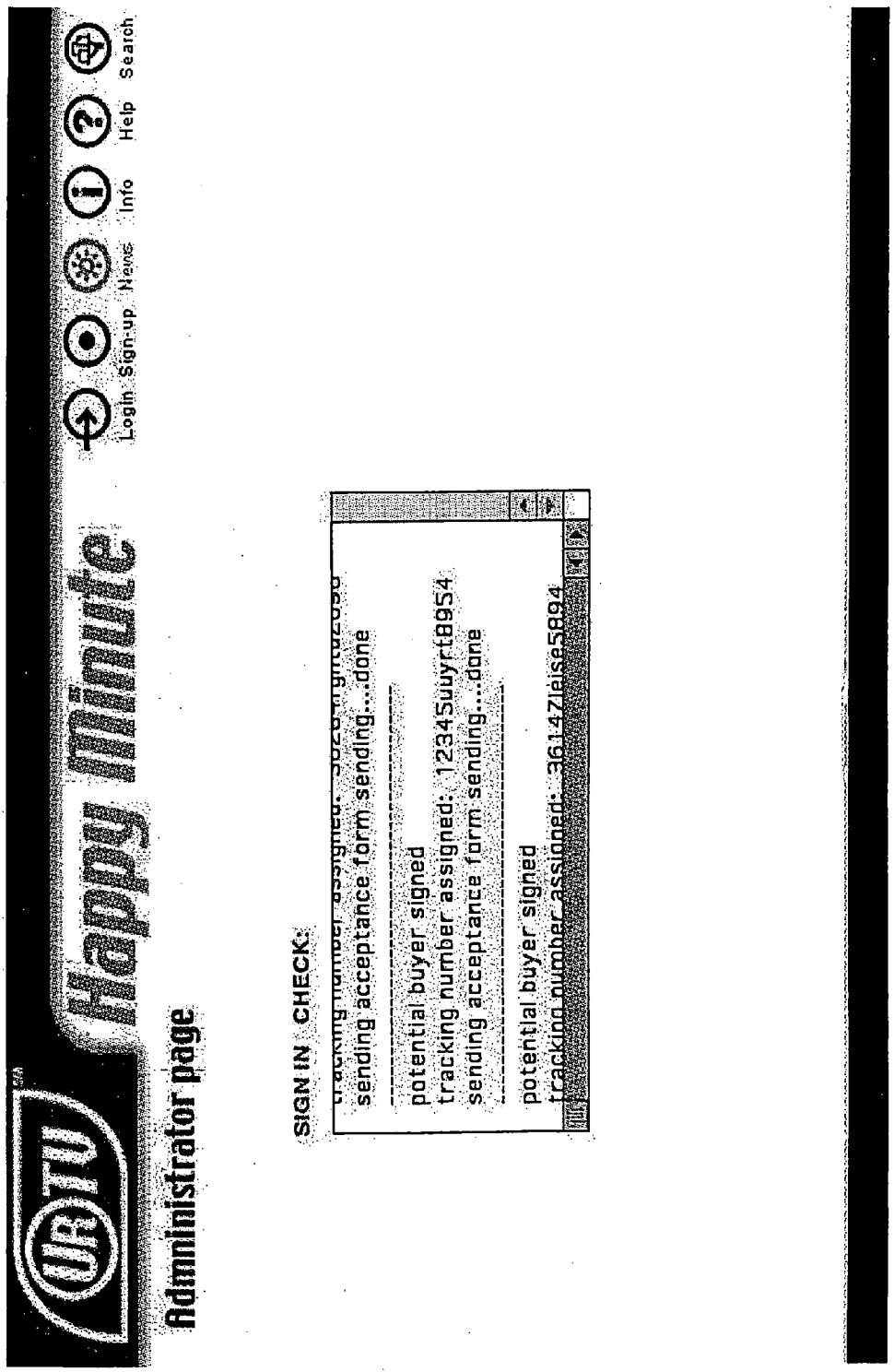
FIG. 9 illustrates an exemplary embodiment of an administrator page showing that the central controller has received a buyer "sign-in," automatically assigned a tracking number, and having sent an acceptance form.
Figure 10:
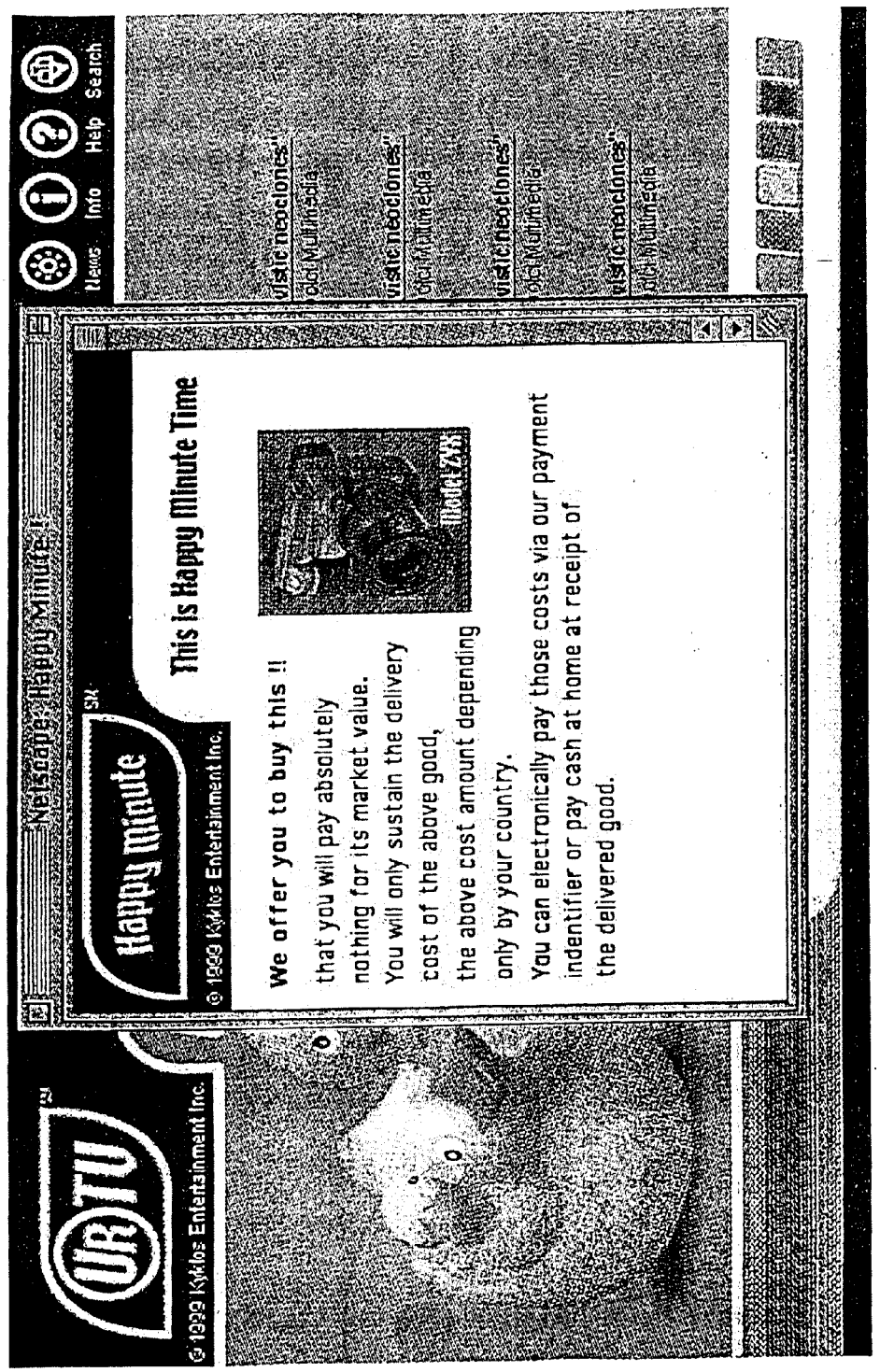
FIG. 10 illustrates an exemplary embodiment of a sale offer information page received by a potential buyer.
Figure 11:
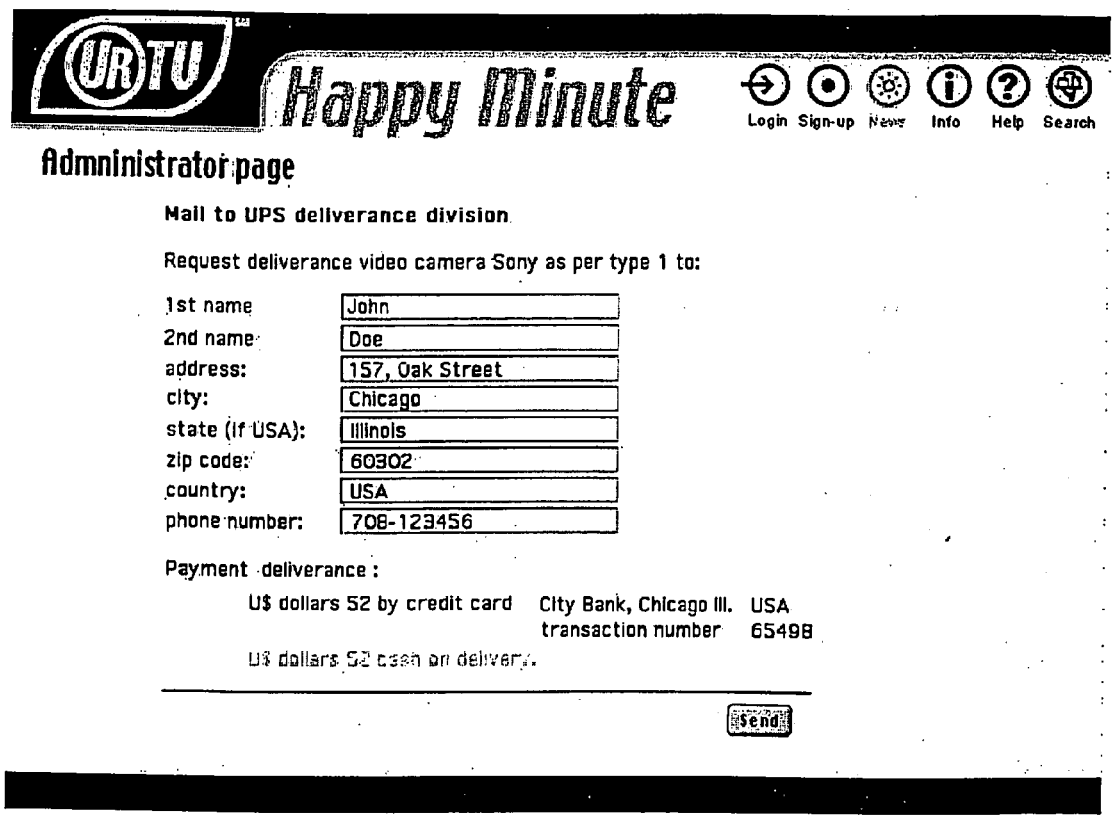
FIG. 11 illustrates an exemplary embodiment of a personal data entry form to be completed by a potential buyer.

Referring again to FIG. 22, while the buyer is browsing the Web site, a sale offer may be randomly generated and received by the buyer (S.20). As illustrated in the example of FIG. 8, the sale offer may appear as a pop-up window and include basic information concerning the sale offer (e.g., the particular product or service being offered, basic terms of the offer, etc.). The pop-up screen containing the sale offer may also include icons to permit the buyer to "Sign-in" and accept the offer, or "Leave," thereby rejecting the offer. If the buyer rejects the offer, then a notice (such as that shown in FIG. 21) may be provided to the buyer to provide notification of the canceled sale offer (S.90). Thereafter, the buyer may continue to further browse the Web site (S.10), go to another Web site, or terminate the current browser session.

As further shown in FIG. 22, if the buyer decides to accept the offer and sign-in, then another pop-up screen may be provided (such as that shown in FIG. 10) to provide more detailed information concerning the sale offer (S.30). After reviewing and further considering the sale offer, the buyer may be given another opportunity to accept or reject the sale offer. If the buyer rejects the offer, then a notice (such as that shown in FIG. 21) may be provided to provide notification of the canceled sale offer (S.90). Otherwise, if the buyer decides to continue with the sign-in process, then an electronic request form (such as that shown in FIG. 11) may be displayed to request basic contract data, including the name and address of the buyer (S.40). At this point, the buyer may again be given the opportunity to continue with the sign-in process (S.50) or to reject the offer and receive a notice of the canceled sale offer (S.90).

Figure 13:
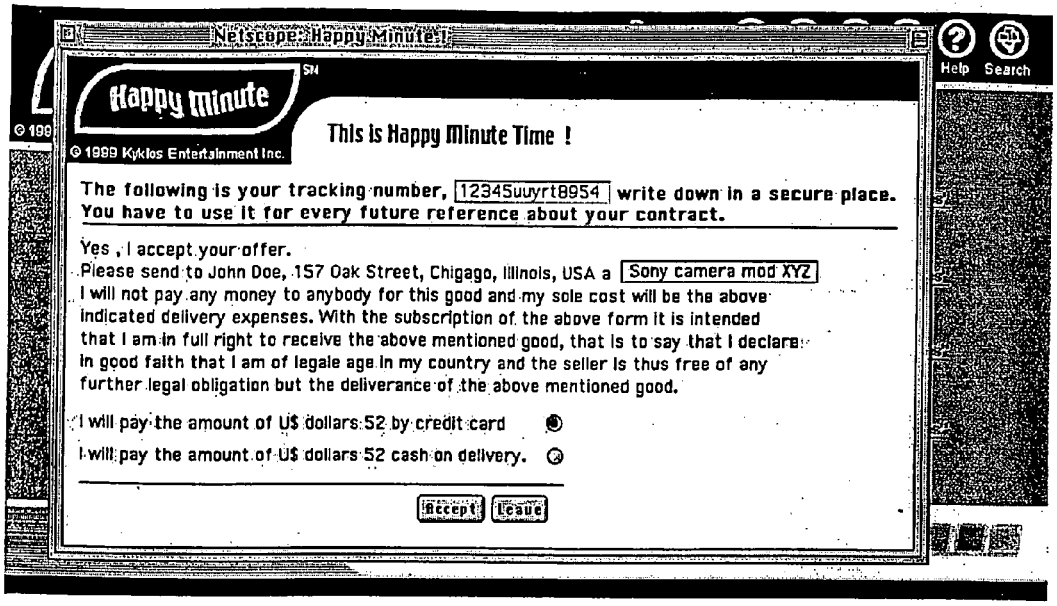
FIG. 13 illustrates an exemplary embodiment of an acceptance form received and completed by the buyer.
Figure 14:
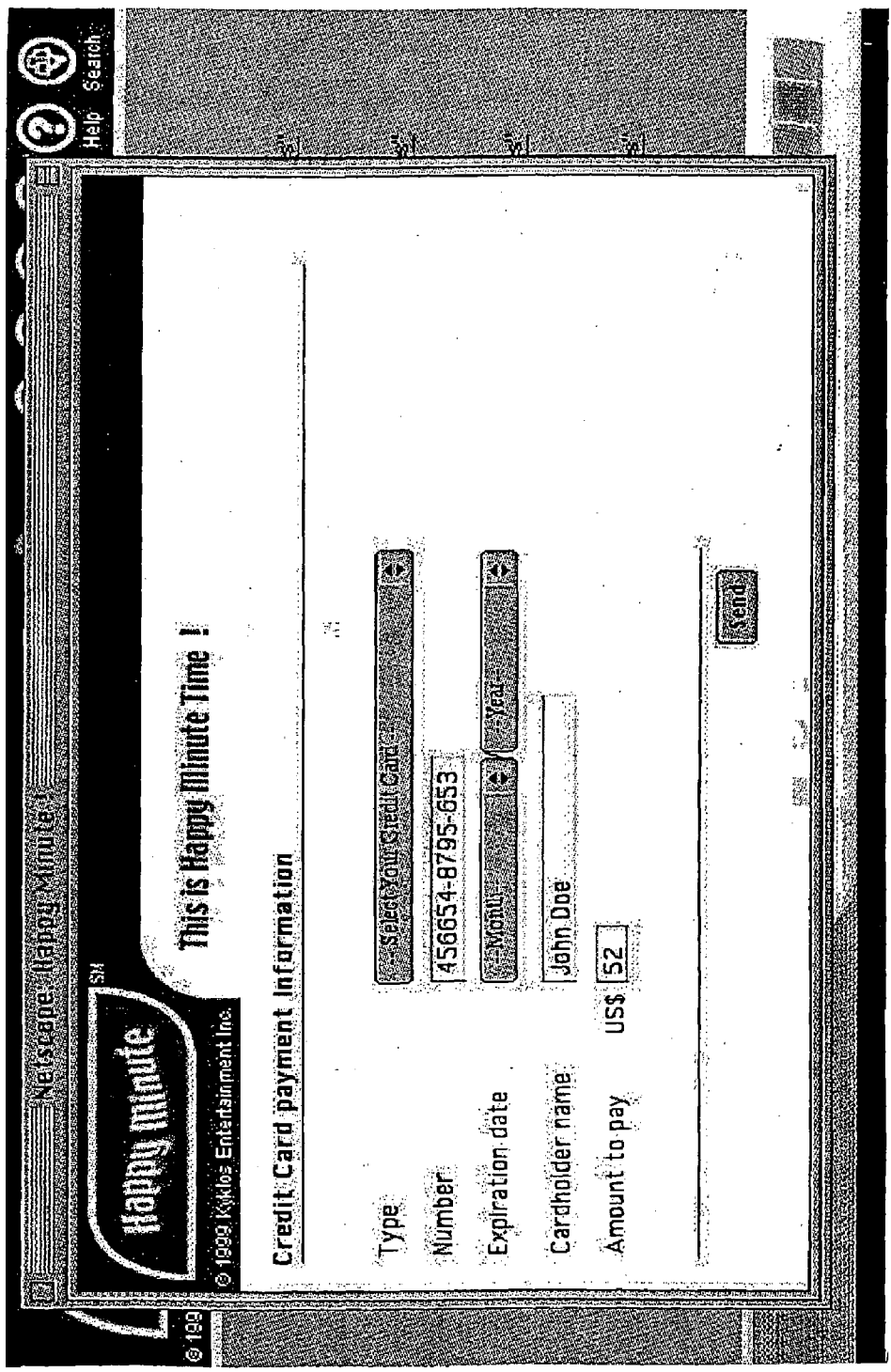
FIG. 14 illustrates an exemplary embodiment of a credit card data entry form to be completed by the buyer.
Figure 15:
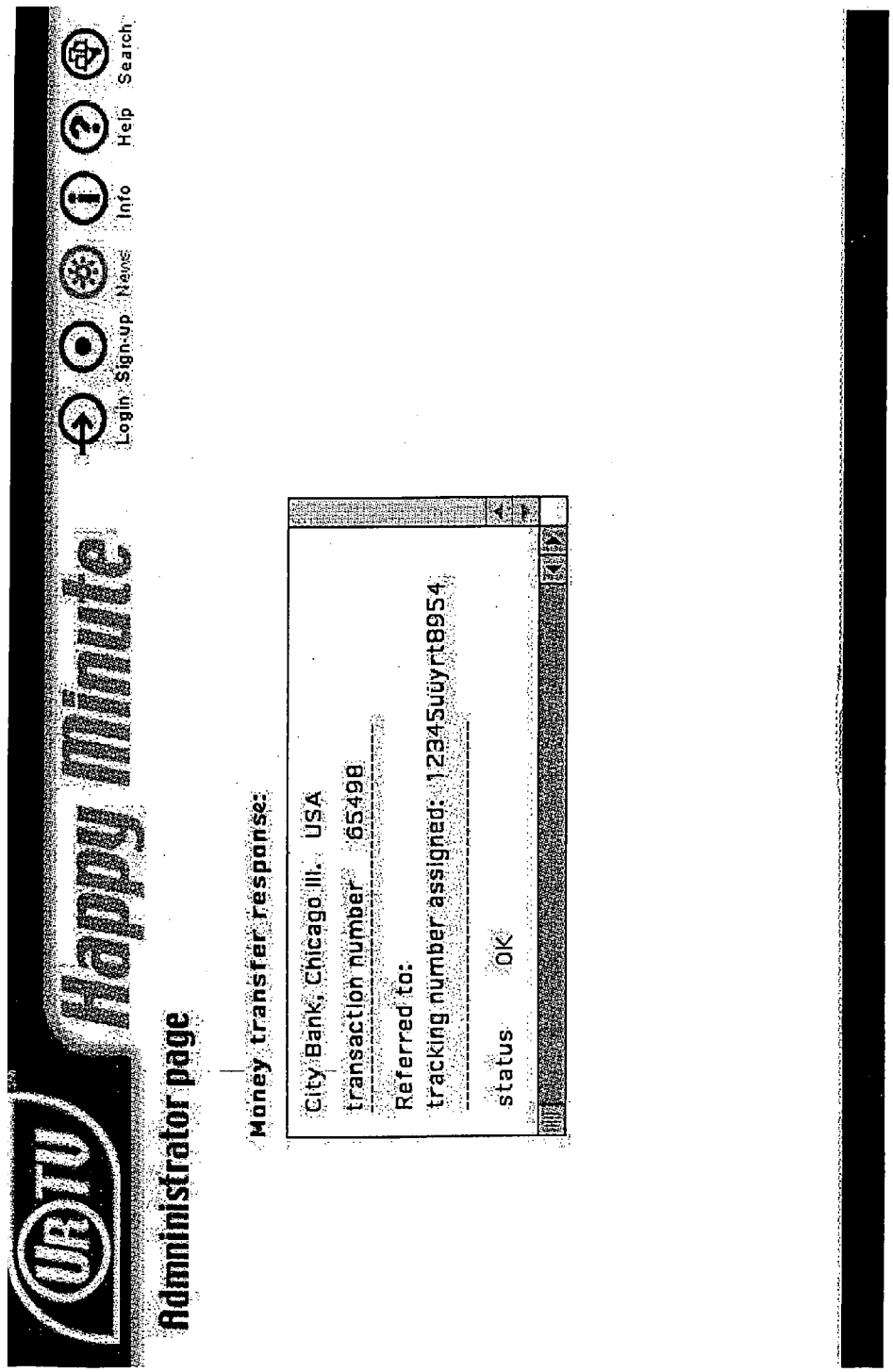
FIG. 15 illustrates an exemplary embodiment of an administrator page showing money transfer response data.
Figure 16:
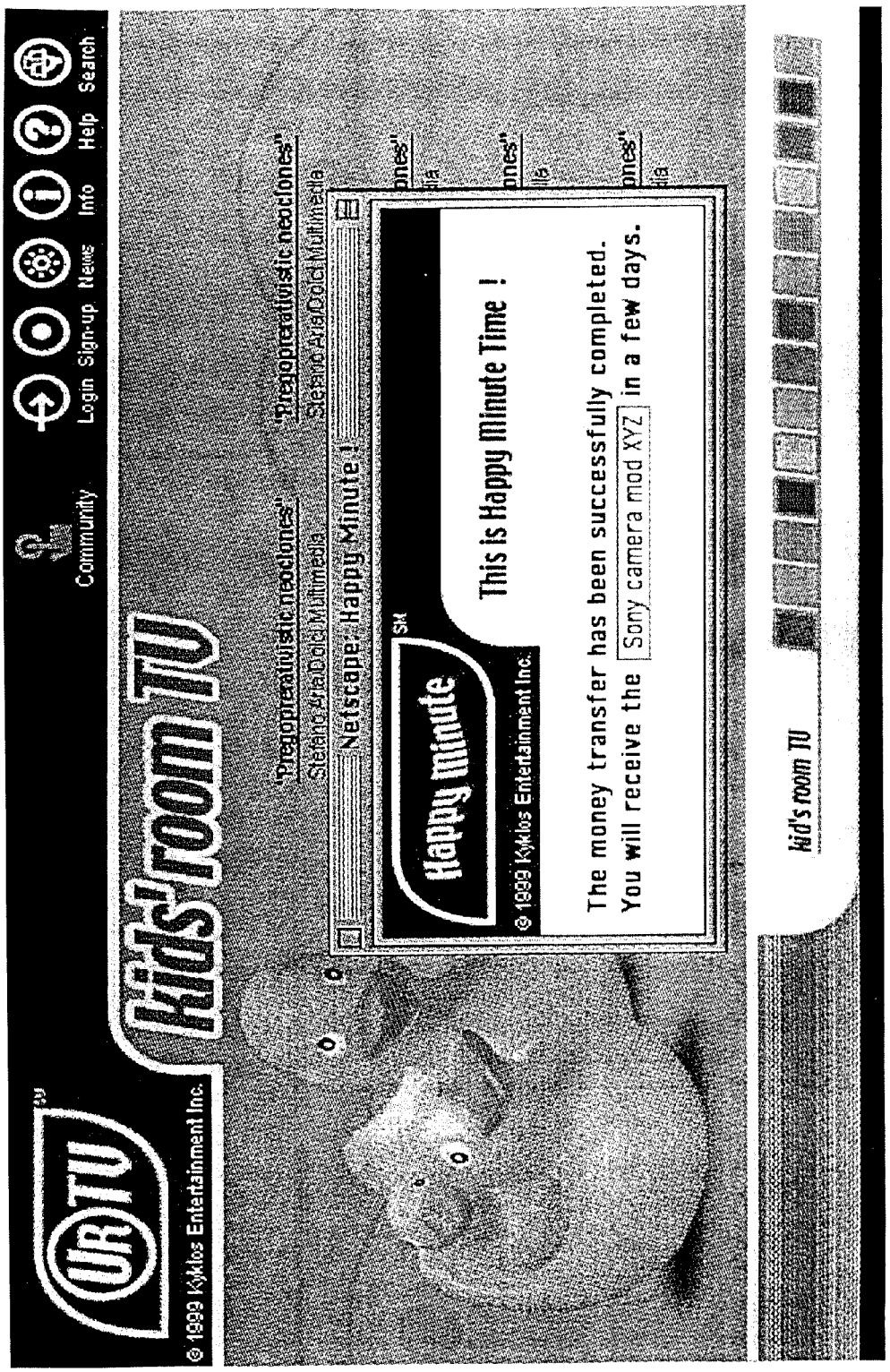
FIG. 16 illustrates an exemplary embodiment of a successfully completed transaction page received by a buyer.
Figure 17:
FIG. 17 illustrates an exemplary embodiment of an administrator page showing data for a successfully completed transaction.
Figure 18:
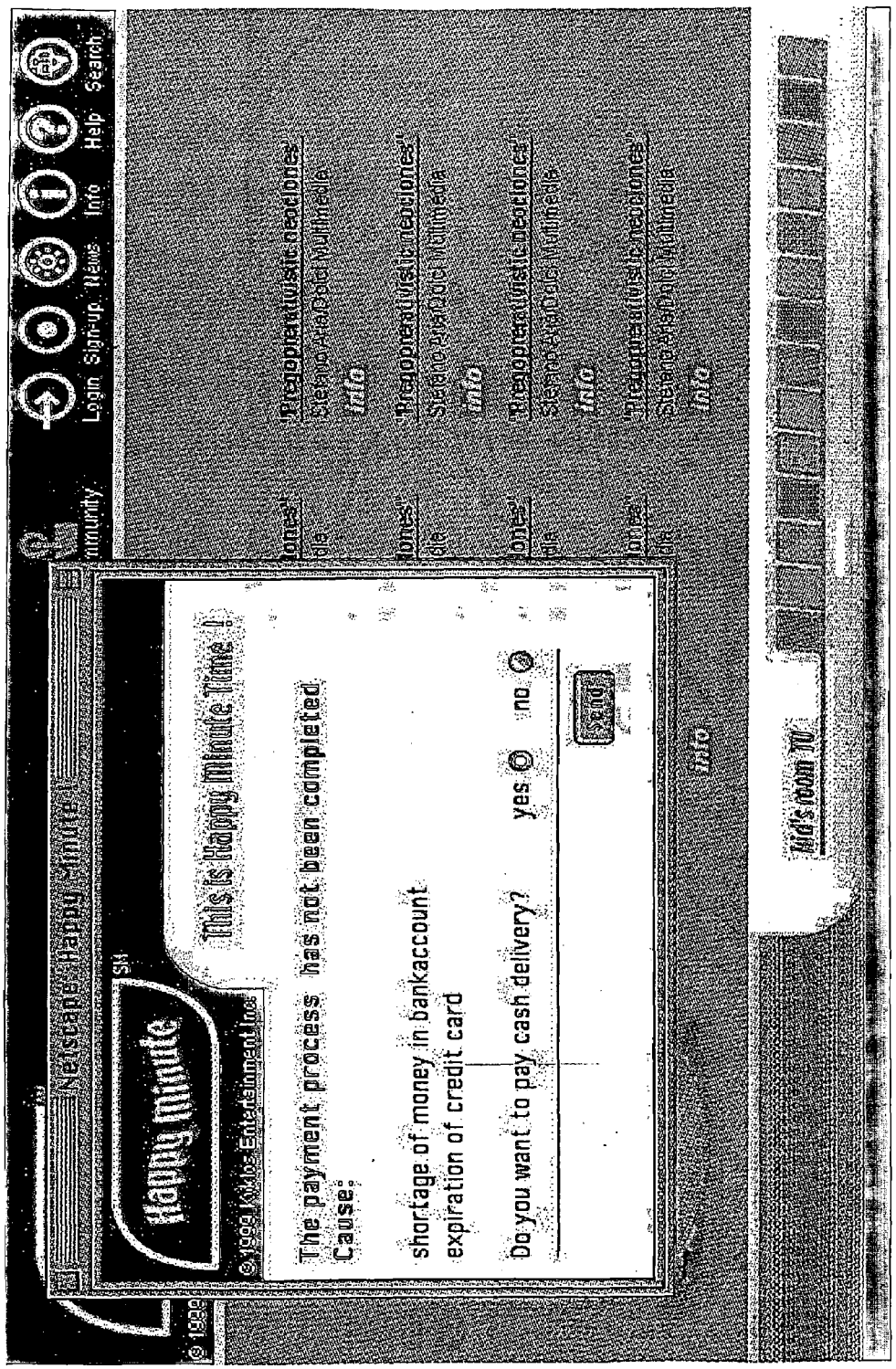
FIG. 18 illustrates an exemplary embodiment of a unsuccessfully completed transaction page received by a buyer.
Figure 19:
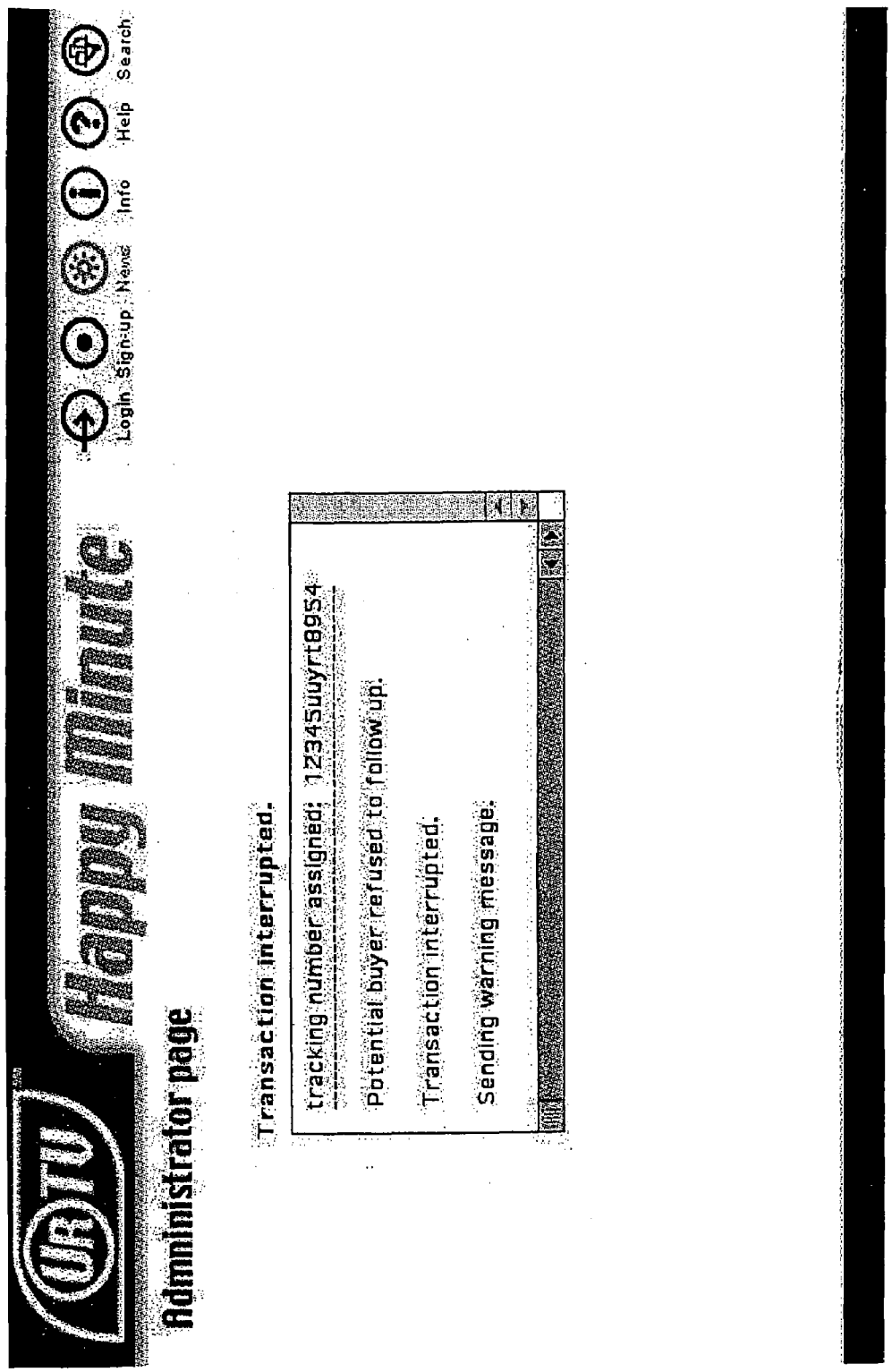
FIG. 19 illustrates an exemplary embodiment of an administrator page showing data for an unsuccessfully completed transaction.
Figure 20:
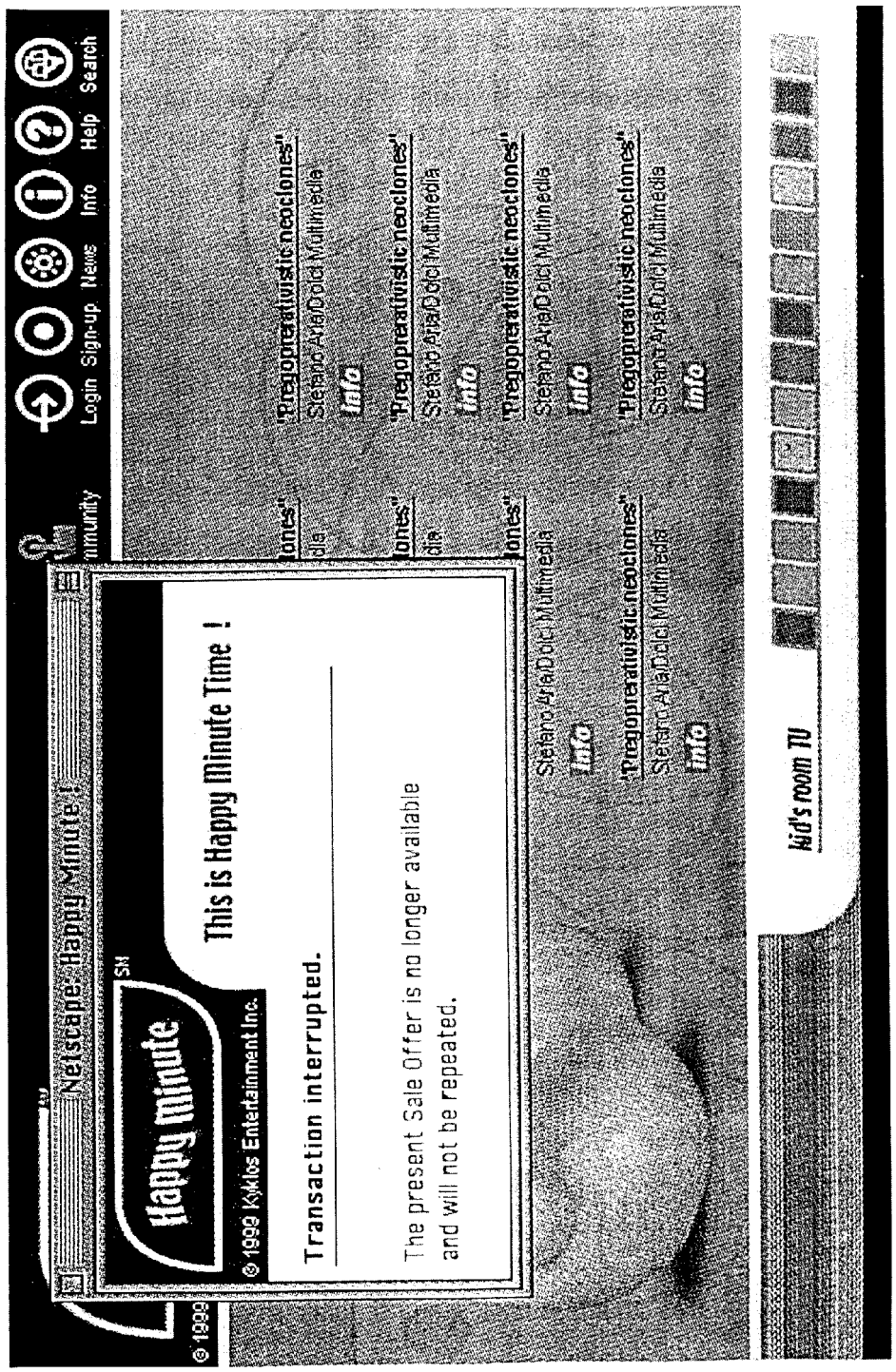
FIG. 20 illustrates an exemplary embodiment of a warning message on the Web site's page, notifying a buyer that a sale offer is no longer available and the transaction is considered null and void.
Figure 21:
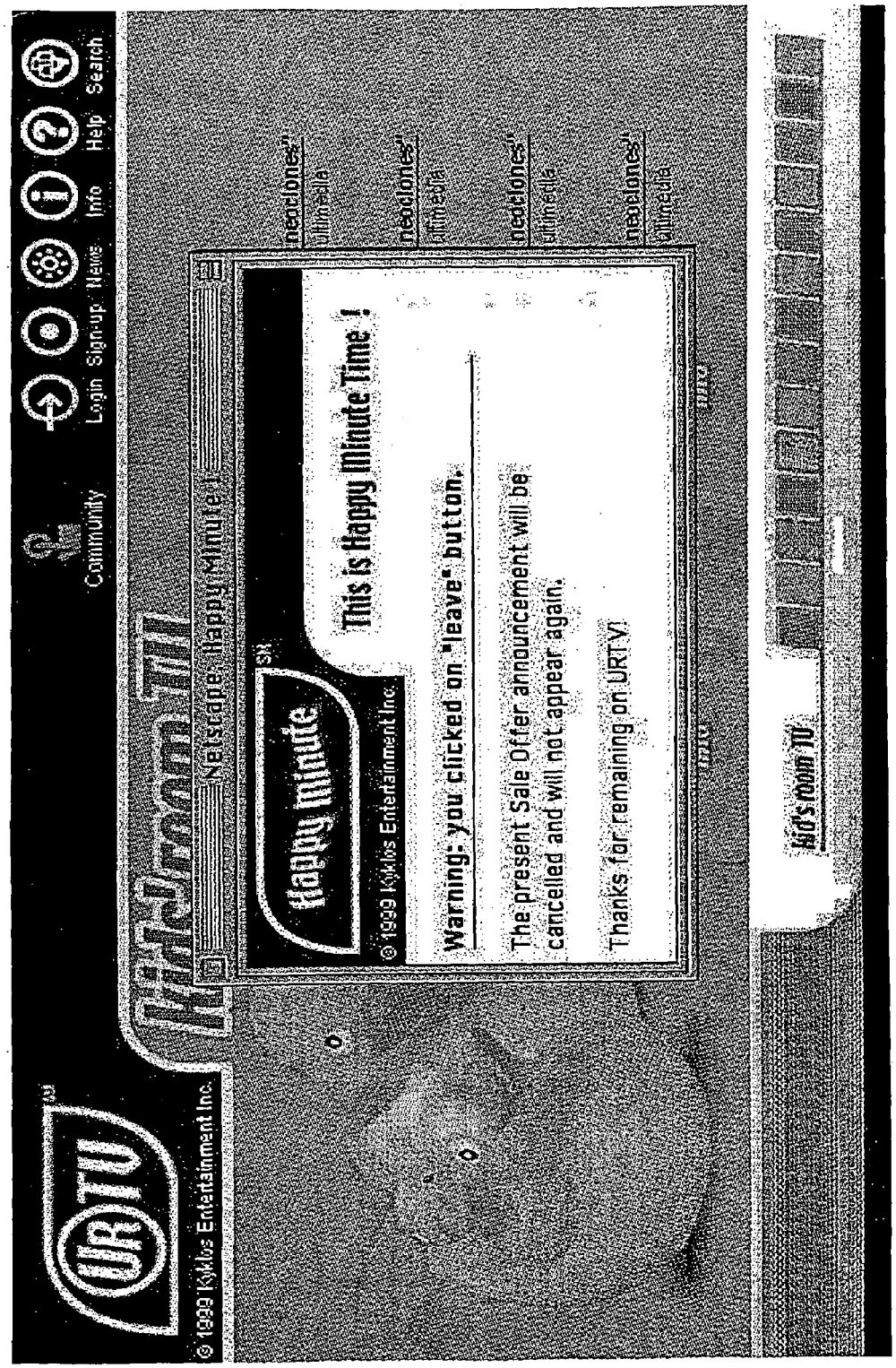
FIG. 21 illustrates an exemplary embodiment of a sale cancellation announcement received by a potential buyer in response to clicking the "leave" button indicating that a sale offer is no longer available.

If the buyer enters all of the requested contract data and continues with the sign-in process, then an acceptance form (such as that shown in FIG. 13) may be displayed to the buyer (S.50). The acceptance form preferably displays a tracking number that is generated for each transaction with the buyer. The tracking number can be used by the buyer in the future when contacting the site administrator or seller with questions regarding, for example, the contract or delivery of goods. As illustrated in FIG. 13, the acceptance form may also include or display the type of product or service to be accepted, and the cost of the transaction including, for example, the delivery, or other cost to be paid by the buyer. Moreover, the acceptance form may indicate, in unambiguous terms, that the buyer accepts each and every one of the terms of the transaction. In order to accept the displayed terms of the offer, the buyer may be requested to confirm acceptance of the terms by selecting a predetermined icon (such as an icon labeled "Accept" or "I ACCEPT"). Alternatively, the acceptance form could include an icon automatically labeled with the buyer's entered name that must be selected by the buyer to accept the offer. On the other hand, the buyer could still decline to accept the offer by selecting another predetermined icon (such as an icon labeled "Leave" or "I DECLINE").

As shown in FIG. 22, if the buyer continues with the sign-in process and confirms acceptance, then the process continues and the buyer is provided with a payment request form (S.60). The payment request form displayed to the buyer may be a credit card data entry form, such as that illustrated in FIG. 14. With such a form, each buyer who pays by credit or debit card can enter payment data, such as the credit card account number, account limit, name of issuing institution and expiration date. Alternatively, any other payment method and request form may be utilized.

The payment information received from the buyer may be analyzed by the central controller before the sale is completed. For example, the central controller may contact a payment source, such as a bank or a credit card issuer, to confirm that the payment information is valid and that the appropriate amount of credit funds is available. If the payment information provided by the buyer is valid, then the central controller may establish a buyer account with a record of the money transferred from the buyer. The central controller also notifies the buyer of the successful completion of the money transfer (S.70) by generating a confirmation screen on the Web site (such as the illustrated embodiment of FIG. 16). Thereafter, the central controller completes the sale offer transaction with the buyer by delivering or shipping the agreed upon product to the buyer's address (S.80). If, however, the payment information provided by the buyer is invalid, the central controller will automatically notify the buyer of the unsuccessful completion of the payment process (S.65). Preferably, a message screen is displayed on the Web site (such as that illustrated in the embodiment of FIG. 18) to inform the buyer that the payment process has not been completed. This message screen may indicate the cause of the incomplete payment process (such as exceeding the amount of available credit, a shortage of funds or an invalid credit card number) and provide the buyer with the option to make payment (if any) upon receipt of the product or service (S.75). Other alternative payment methods may also be displayed.

In the event that the buyer is given an option to use an alternative payment method (S.75), the buyer may indicate their selection to continue or terminate the sale offer transaction. For example, in order to select a particular payment option (such as payment upon delivery), the buyer need only select a predetermined icon (such as an icon labeled "Yes") in response to the inquiry. In response to the buyer's decision to accept the alternative payment method, the sale offer transaction may be completed as normal (S.80). If, however, the buyer does not select an alternative payment method and decides to reject the sale offer (by selecting an icon labeled "No" or "Leave"), then the central controller terminates the sale offer transaction with the buyer. In such a case, the buyer may receive a warning message (such as that illustrated in FIG. 21) of the cancellation of the sale offer or, if the time period for the sale offer has expired, the buyer may receive a message (such as that illustrated on FIG. 20) that the sale offer was terminated. Either the warning message or the cancellation announcement informs the unsuccessful buyer that the transaction has been interrupted and the conditional sale offer is no longer available and will not be repeated. At this point, the transaction is considered null and void, with the conditional offer being rescinded by the seller.

Various modifications may be made to the embodiment shown in FIG. 22. For example, alternative warning messages or information screens, that provide other types of helpful information to the user or potential buyer may also be displayed by the central controller. For example, a buyer may be informed that the offer is not rescinded unless a particular payment option is selected within a stated amount of time. The buyer may also be made aware of the time remaining to accept a sale offer. Moreover, the amount of remaining products or services (if applicable) may also be displayed to the buyer. Additionally, information about successful buyer transactions may be displayed to the unsuccessful buyer.

Figure 23:
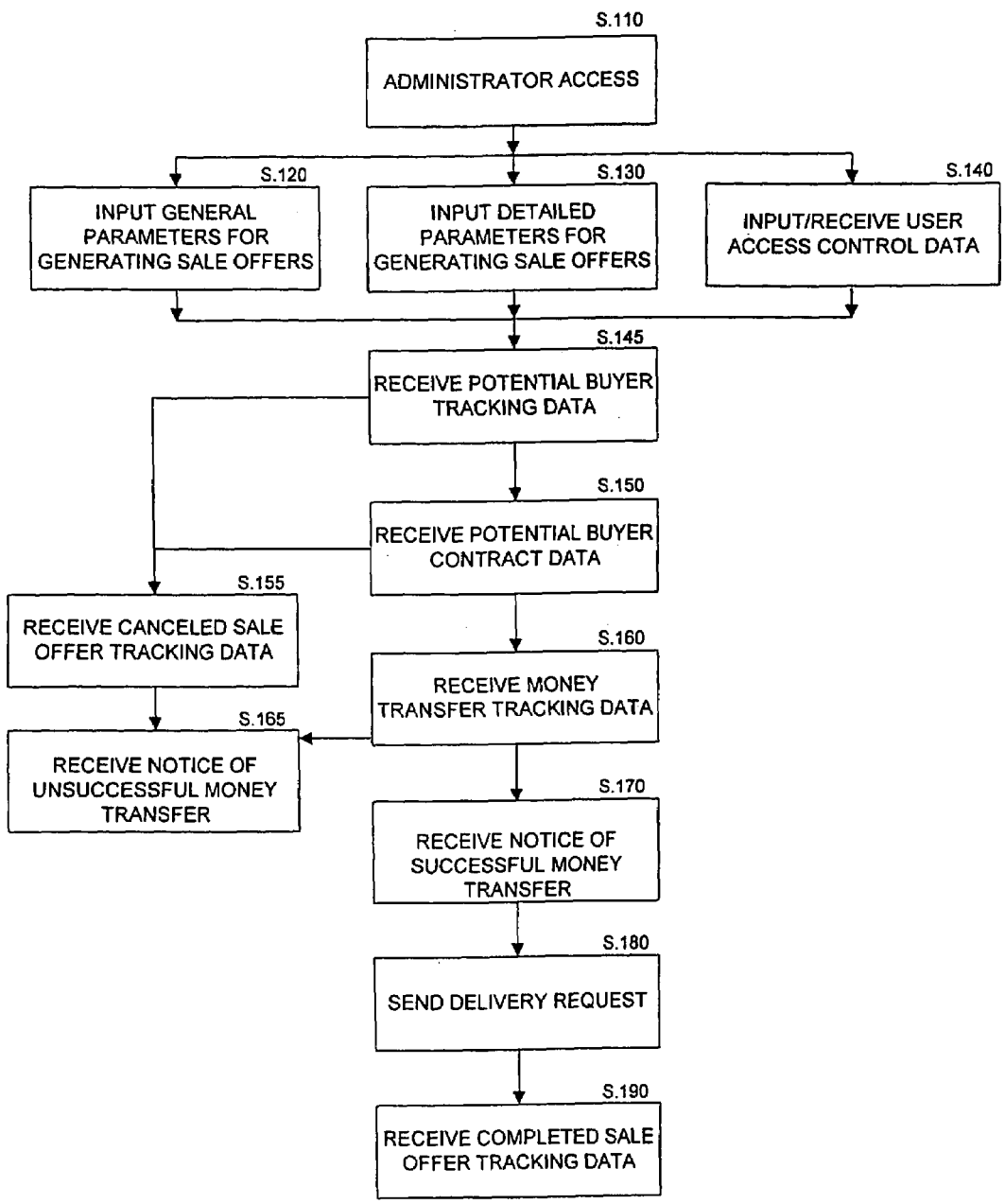
FIG. 23 is an exemplary flow chart illustrating how a seller or site administrator inputs sale offer parameters to generate sale offers, receives buyer tracking and contract data, and completes a sale offer transaction with a buyer.

FIG. 23 is an exemplary flow chart that illustrates the various features and operations that are performed by the seller or Web site owner (herein referred to as the "site administrator") for generating and completing sale offer transactions with buyers. As illustrated in FIG. 23, the site administrator may log on to the central controller (step S.110) to access one or more administrator pages during any stage of a sale offer transaction. The administrator pages may be displayed on the site administrator's interface and be used to control the operation of the sale offer system and the features of the sale offer. To access the administrator pages, the site administrator may log on to the central controller through a local connection or over the network system from a remote location (such as the seller interface). With the administrator pages, such as that shown in FIGS. 7A-7C, the site administrator may manually program or select the number of people that will receive a sale offer during any period of time. Moreover, the site administrator may select the type or number of products or services to be offered, the amount of the purchase price of the product or service, and the duration of the conditional offer or sale offer. The site administrator may also determine the kind of data needed to be received from the buyer in order to consummate the sale.

The administrator pages of the present invention may also be used to provide information to the buyer or site administrator. For example, as further described herein, the central controller may be automatically or manually programmed by the site administrator to provide the buyer with information about the Web site and/or the sale offer. The administrator pages may also receive and display information from the central controller and inform the site administrator of various operational characteristics related to the sale offer system, such as the number of people visiting the Web site or the number of people that can receive the sale offer at any given point in time.

Figure 7A:
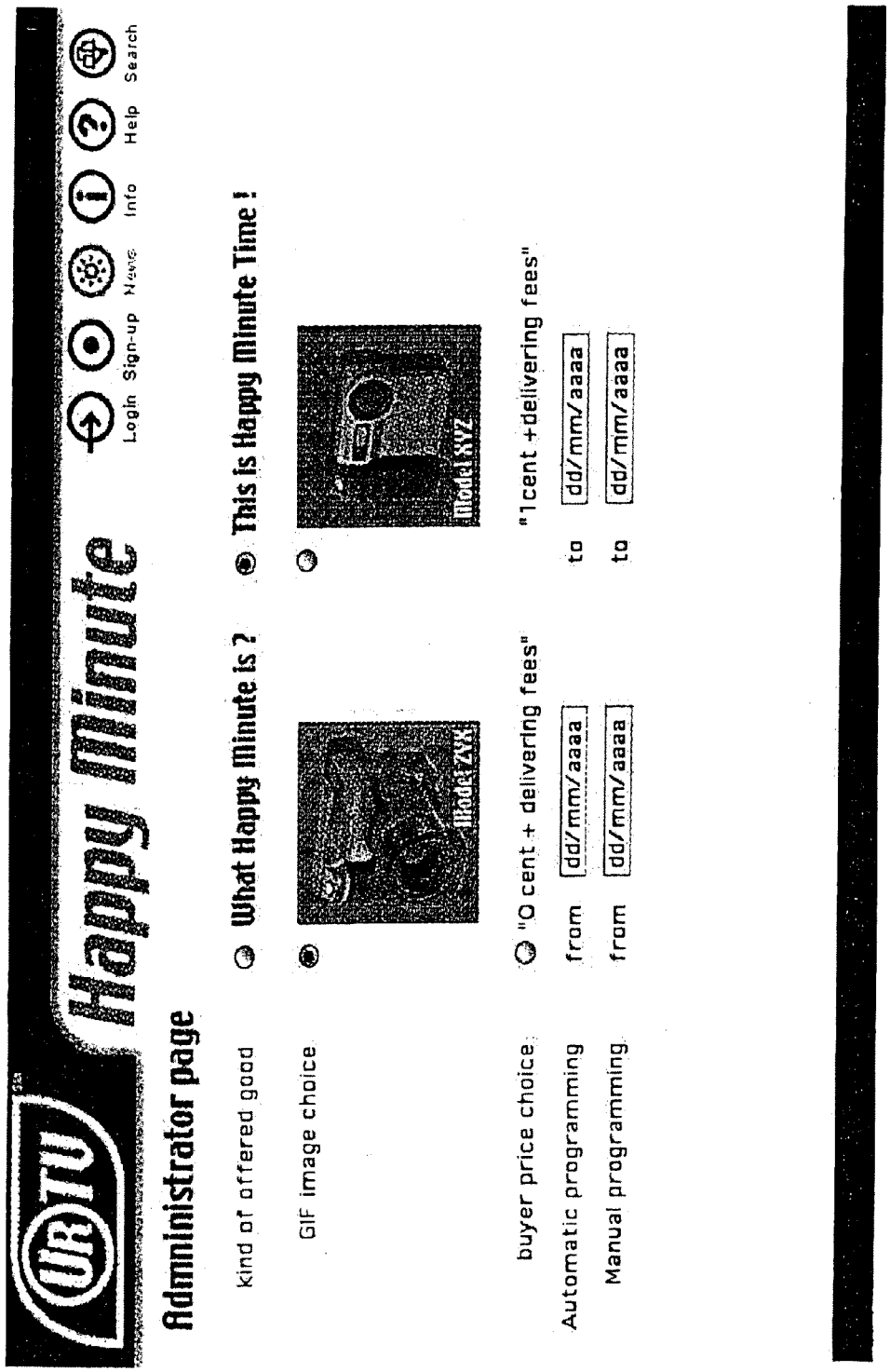
FIG. 7A illustrates one aspect of the features of an administrator page for use by the Web site's administrator.
Figure 7C:
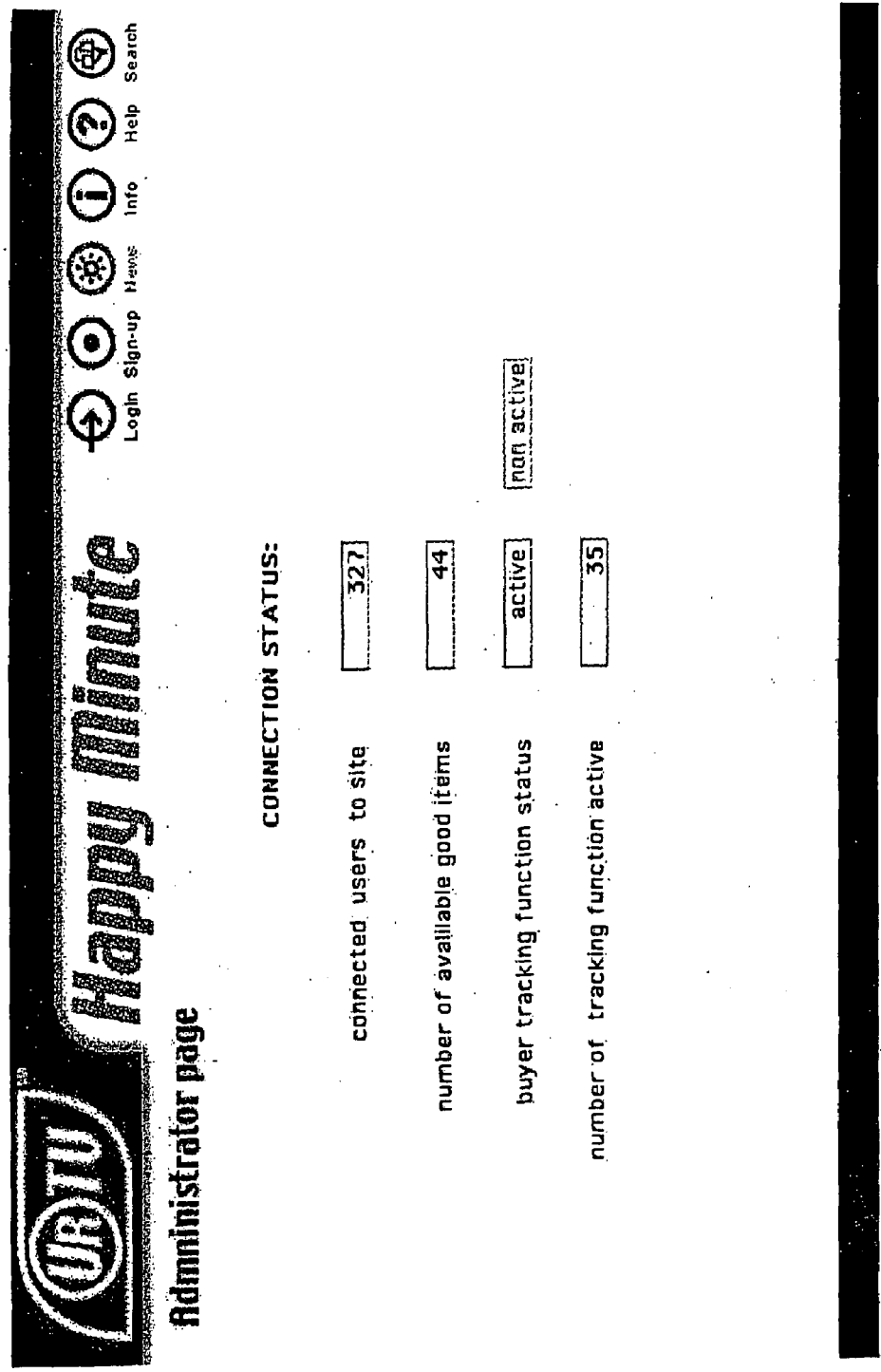
FIG. 7C illustrates yet another aspect of the features of an administrator page for use by the Web site's administrator.

Referring again to FIG. 23, after the site administrator has accessed the central controller and administrator pages (S.110), various tasks may be performed by the site administrator. For example, the site administrator may manually program one or more of the features of the sale offer by entering general or detailed sale offer parameters (S.120; S.130). For example, if an administrator page such as that shown in FIG. 7A is provided, the site administrator may manually enter and program general parameters relating to the sale offer (S.120), such as the type of product or service to be provided, the image to be displayed with the offer and the pricing or purchasing terms for the goods or services (e.g., "0 cent+delivering fees" or "1 cent+delivering fees"). Other general parameters related to the sale offer may also be entered by the site administrator, such the time or manner in which the sale offer is generated. For instance, an automatic or manual programming option may be selected (see FIG. 7A) to indicate the time period (e.g., between a start date and an ending date) during which the generation of the sale offers is to be automatically or manually programmed.

The site administrator may also manually enter and program detailed parameters relating to the sale offer (S.130). For example, if an administrator page such as that illustrated in FIG. 7B is provided, the site administrator may enter the specific location and timing for generating the sale offers. Since sale offers may be displayed on any page or room of the Web site, the site administrator may specify a particular room location for generating the sale offers or program the central controller to generate the sale offer in any randomly selected number of room locations. The site administrator may also program the central controller so that the sale offers are generated at randomly selected times or a predetermined frequency over a defined time period.

Access to the central controller and administrator pages can also permit the site administrator to input or receive user access control data (S.140). For example, with an administrator page, such as the embodiment illustrated in FIG. 7C, the site administrator may receive a report on the status of the Web site at any given moment, including the number of users connected to the site, the number of available products or services to provide through the sale offers, whether a buyer tracking function status is active or nonactive, and the number of active tracking functions. The information provided to the site administrator could also indicate the number of people who are eligible to receive a conditional offer (as described hereinbelow) or sale offer. Preferably, the information provided to the site administrator is updated and displayed in real time. However, other embodiments may include displaying various types of statistical data, based on data collected for selected time periods or any other type of variable such as the number of Web site "hits" during a particular pattern of sale offers. In addition, information provided to the site administrator may indicate the amount of remaining time each potential buyers has to respond to a particular sale offer, or the particular room in which particular users are visiting. Moreover, the information displayed could allow the administrator to profile particular Web site users and match suitable types of sale offers accordingly. For example, a product or service for use in the kitchen could be conditionally offered to a user who is visiting, has visited, and/or will likely visit the Kitchen TV room. In general, the present invention may involve conditionally offering products that are specifically related to the content of the Web site or the room itself.

In accordance with the invention, each conditional offer or sale offer may be made available to all buyers that are currently visiting the Web site or are in any way exchanging information with the Web server or central controller. Thus, buyers who are viewing information from the Web site in an off-line browsing or cached browsing mode will not receive or be able to view the sale offer. Further, in some cases the capacity of the Web server or central controller may be limited so that only a predetermined number of buyers (e.g., 200 buyers) can receive the sale offer at any given time. Alternatively, a limited number of sale offers (not necessarily restricted by the capacity of the server or controller but selected by the seller) may be provided to buyers visiting and exchanging information with the Web site when the offer is to be made. In such a case, the sale offer may expire prior to the duration or period of the offer, if all of the predetermined sale offers have been accepted by buyers who received the offer through the Web site.

It is also possible to target particular buyers, so that only buyers who have a certain profile or other type of identifier that matches a predetermined profile, characteristic, or identifier selected by the seller can actually receive the sale offer. This type of targeting can be accomplished by means of setting additional parameters associated with the generation of sale offers. With such a targeted approach, the seller or site administrator may target specific types of buyers with the sale offer. The profile of each buyer may be determined by the central controller based on historical and/or statistical data of visitations to the Web site (or other Web sites) by the buyer or a related buyer group. Alternatively, the profile of a buyer may be determined by the central controller by searching and gathering information from one or more internal or external databases.

According to the sale offer parameters entered by the site administrator, the central controller will generate the sale offer at one or more locations in the Web site. As discussed above, a pop-up screen or window may be generated (see, e.g., FIG. 8) to notify potential buyers visiting the Web site of the sale offer. In essence, each Web site visitor will be given a choice between accepting the offer (subject to certain conditions) or rejecting the offer. As shown in FIG. 8, to preliminarily accept the offer, the potential buyer must select an icon labeled "Sign-In." To decline the offer, the potential buyer may select an icon labeled "Leave" or fail to accept the offer within the predetermined period of time set by the site administrator. For all potential buyers that sign-in, tracking data may be collected by the central controller and provided to the site administrator (S.145). The tracking data for each buyer, which can be presented to the site administrator though an additional administrator page (see, for example, FIG. 9), may include a log of the actions performed by the potential buyer (for example, "potential buyer signed") and the tracking number assigned by the central controller (for example, "12345uuyrt8954"). In operation, the central controller may automatically assign a unique tracking number for each sale offer transaction with a buyer. In addition, the central controller may time-stamp the preliminarily accepted offer from the buyer, and then store the time-stamped data for purposes of record keeping.

When a potential buyer decides to sign-in, the central controller causes a sale offer information page to be served up and displayed to the buyer. The information page (see, e.g., FIG. 10) may provide more detailed and helpful information regarding the sale offer, such as the type of product or service offered, as well as the terms of the offer. If a potential buyer decides to continue with the sign-in process, one or more contract data entry forms and acceptance forms may be displayed to request contract data (such as name, address etc.) and confirmation of the acceptance of the sale offer by the buyer. The data entry forms preferably comply with relevant contract law principles and, as such, constitutes an electronic contract with a number of particular blanks to be intentionally filled out or completed by the buyer. This information may be provided to the potential buyer to indicate the purpose of the forms and confirmation. Additionally, the potential buyer may be informed that such information could be treated adequately and in accordance with relevant privacy guidelines, such as set forth in the European Data Directive or other applicable law.

As further shown in FIG. 23, any contract data or confirmation entered by the potential buyer may be received and viewed by the site administrator (S.150). For this purpose, an administrator page may be provided (such as shown in the embodiment illustrated in FIG. 12) to indicate to the administrator the contract data and confirmation that was received by the central controller from the potential buyer. During the sign-in transaction, the potential buyer may decline to accept the offer simply by pressing a predetermined icon (such as an icon labeled "Leave"). If the potential buyer leaves the sign-in process before providing all of the requested contract data, then central processor registers the leave selection and informs the potential buyer that the transaction has been closed and that the offer is no longer available. In such cases, the site administrator is also informed whenever a potential buyer user has terminated the sign-in process or declined to accept the offer (S.155).

If the potential buyer provides all of the necessary contract data and confirms acceptance of the contract terms, then the central controller receives and communicates the buyer's acceptance of the sale offer to the seller or administrator viewing through another administrator page. Next, a credit card data entry form is served up by the central controller and displayed on the buyer interface. In a preferred embodiment of the invention, the payment process begins when the buyer completes the credit card data entry form and selects the icon labeled "Send." The buyer who pays by credit card, preferably enters payment data such as the credit card account number, account limit, name of issuing institution and expiration date. Alternatively, any other payment method may be utilized. When the requested payment information is to be sent from the buyer, the central controller may perform an encryption operation by using any known encrypting protocol on the entered payment data. Such encryption protocols not only enhance the ability to authenticate the sender of a message, but also serve to verify the integrity of the message itself, proving that it has not been altered during transmission. Such techniques are referred to herein generally as cryptographic assurance methods, and will include the use of both symmetric and asymmetric keys as well as digital signatures and hash algorithms. The practice of using cryptographic protocols to ensure the authenticity of senders as well as the integrity of messages is well known in the art and need not be described here in detail. For reference, one of ordinary skill in the art may refer to Bruce Schneier, Applied Cryptography, Protocols, Algorithms, And Source Code In C, (2d Ed, John Wiley & Sons, Inc., 1996).

In order to verify the payment information received from the buyer, the central controller may contact a payment source, such as a bank or a credit card issuer, to confirm that the payment information is valid and that the credit amount or appropriate funds are available. Accordingly, a buyer is prevented from using a credit card with an exceeded credit limit, or a debit card with insufficient funds to establish a buyer account. During this verification process, the central controller may generate and display money transfer response data for viewing by the site administrator (S160). Through an administrator page (see, e.g., the embodiment of FIG. 15), the site administrator may monitor the progress and status of the money transfer attempted by the central controller. If the money transfer is successful, then the central controller may automatically establish a buyer account and notify the buyer of the successful transaction. In addition, a notification of the transaction may be provided to the site administrator through an administrator page (S.170). Thereafter, the central controller completes the sale transaction by generating a delivery request so that the purchased goods or services will be timely delivered to the buyer. The delivery request may be automatically generated and sent by the central controller, or each delivery request from the central controller may be reviewed and confirmed by the site administrator before it is sent to an agent of the seller for processing. For this purpose, each delivery request may be received and viewed by the site administrator through an administrator page (see, e.g., the embodiment of FIG. 17) before the delivery request is sent (S.180). Any completed sale offer tracking data may also be provided and viewed by the site administrator (S.190). This may be performed after the limited period for the sale offer has terminated, so that the site administrator can review the results of the sale offer and the number of sale transactions that were successfully completed.

Referring again to FIG. 23, if the attempt to transfer money fails (e.g., due to an invalid credit card number, exceed credit limit, or insufficient funds), then the buyer is informed of the failed transaction. The central controller may also provide notice of the failed money transaction to the site administrator (S.165). Once again, an administrator page may be provided to provide such information to the site administrator. Preferably, the notification to the buyer informs the buyer of the cause of the incomplete payment process and provides the buyer with the option of choosing one or more alternative payment methods, such as cash payment upon delivery. If the buyer refuses to select an alternative payment method within a predetermined period of time, then the central controller may display a warning or sale cancellation message to indicate to the buyer that the conditional offer is no longer available and has been rescinded.

Other embodiments of the invention will be apparent to those skilled in the art from consideration of the specification and practice of the invention disclosed herein. For example, each Web site may host sale offer(s) from one or more different sellers (that are related or unrelated parties). In addition, a special room or page may be provided indicating the group of goods or services from which sale offers will be made, and/or the day, week or month when such sale offers can be expected to be offered. Such an arrangement will permit buyers to view the types of goods or services that will be made available and, optionally, to anticipate or know the day, week or month or other general time period during which such goods and services will be offered through the Web site.

Additional alterations and modifications of the present invention will be comprehended by a person skilled in the art after having read the foregoing description. Thus, it is intended that the specification and examples be considered as exemplary only and it should be understood that the invention is not limited to the illustrative examples in this specification. Rather, the invention is intended to cover all modifications and variations that come within the scope of the following claims and their equivalents.

What is claimed is:

1. A method of advertising a Web site by making a sale offer over an electronic network system, comprising the steps of:

randomly generating an offer to purchase a product or service on the electronic network system at an offer price that is substantially equal to a delivery price associated with sending the offered product or service to the buyer, the delivery price being less than a current value of the offered product or service in a competitive market;

communicating the randomly generated offer through the electronic network system at an unknown start time after one or more potential buyers visit the Web site and for a predetermined duration of time while the one or more potential buyers remain visiting the Web site;

completing the sale of the product or service at the offer price through the electronic network system in response to an acceptance of the offer at the offer price by a buyer visiting the Web site within the predetermined period of time; and removing the offer at the offer price from the electronic network system should the buyer visiting the Web site not accept the offer at the offer price within the predetermined period of time.

2. A method of advertising on a Web site by making a sale offer over an electronic network system, comprising:

randomly displaying at least one offer to accept a product or service at an offer price substantially equal to a delivery price of the offered product or service to one or more potential recipients visiting a Web site on the electronic network system at an unknown start time while the one or more potential recipients are visiting the Web site, the delivery price being substantially less than a current value of the offered product or service in a competitive marketplace;

providing an opportunity for the one or more potential recipients visiting the Web site on the electronic network system to accept the at least one randomly displayed offer within a limited duration of time;

receiving an indication of acceptance of the randomly displayed offer at the offer price from the one or more potential recipients visiting the Web site on the electronic network system;

completing the sale of the product or service through the electronic network system in response to an acceptance of the offer at the offer price by the one or more potential recipients visiting the Web site on the electronic network system; and removing the offer at the offer price from the Web site on the electronic network system should the one or more potential recipients visiting the Web site not accept the offer at the offer price within the limited duration of time.

3. The method of claim 2, wherein the step of randomly displaying the offer includes the step of providing a random frequency device for displaying the at least one sale offer in an unpredictable manner.

4. The method of claim 2, wherein the step of randomly displaying the offer includes displaying the offer to a potential recipient on the electronic network system for a predetermined duration of time.

5. The method of claim 2, wherein the step of randomly displaying the offer includes randomly displaying a plurality of offers on the electronic network system during a predetermined period of time.

6. The method of claim 5, further comprising controlling the frequency of randomly displaying the plurality of offers on the electronic network system.

7. The method of claim 6, wherein controlling the frequency of randomly displaying the plurality of offers includes increasing a number of unknown sale offer start times when a number of potential recipients on the electronic network system increases.

8. The method of claim 2, further comprising selecting one of a plurality of different types of product or services offered to the one or more potential recipients on the electronic network system.

9. The method of claim 2, further comprising selecting one of a plurality of different types of products or services offered based on a profile of the one or more potential recipients on the electronic network system.

10. The method of claim 9, wherein the profile of the one or more potential recipients on the electronic network system is based on a history of Internet web sites visited by the one or more potential recipients on the electronic network system.

11. The method of claim 9, wherein randomly generating an offer includes providing the seller with the opportunity to randomly display one of a plurality of different types of products or services on the electronic network system based on a plurality of different types of content displayed on the electronic network system.

12. The method of claim 9, wherein randomly generating an offer includes randomly displaying a first type of product or service that matches content displayed at a first location within the electronic network system and randomly displaying a second type of product or service that matches content displayed at a second location within the electronic network system.

13. The method of claim 2, further comprising the steps of:
    receiving, through the electronic network system, a first indication of acceptance from a potential recipient on the electronic network system in response to the display of the at least one randomly generated sale offer;
    displaying at least one term associated with the at least one randomly generated sale offer in response to the first indication of acceptance;
    receiving a second indication of acceptance from the potential recipient on the electronic network system in response to the display of the at least one term associated with the at least one randomly generated sale offer;
    displaying an acceptance form to the potential recipient on the electronic network system in response to the second indication of acceptance from the potential recipient;
    receiving a third indication of acceptance from the potential recipient on the electronic network system in response to the display of the acceptance form for forming a purchase agreement concerning the offered product or service;
    displaying at least one payment method option in response to the third indication of acceptance;
    receiving at least one payment method selection from the potential recipient on the electronic network system in response to the display of the at least one payment method option;
    transferring a sum corresponding to the selected payment method from the potential recipient to the seller; and
    requesting delivery of the offered product or service to the potential recipient.

14. The method of claim 13, wherein the at least one term associated with the randomly generated sale offer comprises an offer price substantially equal to a delivery price associated with the sale offer transaction.

15. The method of claim 13, wherein the at least one term associated with the randomly generated sale offer comprises an offer price substantially equal to a delivery price associated with the sale offer transaction, the delivery price being less than a current price of the offered product or service in a competitive market.

16. The method of claim 13, wherein the at least one payment method option comprises a credit card payment option or a cash-upon-delivery payment option.

17. The method of claim 13, further comprising the step of withdrawing the at least one randomly generated sale offer in the event the potential recipient does not indicate acceptance within a predetermined period of time after the step of displaying the at least one randomly generated sale offer.

18. The method of claim 13, further comprising the step of withdrawing the at least one randomly generated sale offer in the event the potential recipient does not indicate acceptance within a predetermined period of time after the step of displaying the at least one term associated with the at least one randomly generated sale offer.

19. The method of claim 13, further comprising the step of withdrawing the at least one randomly generated sale offer in the event the potential recipient does not indicate acceptance within a predetermined period of time after the step of displaying the acceptance form.

20. The method of claim 13, further comprising the step of withdrawing the at least one randomly generated sale offer in the event the potential recipient does not indicate acceptance within a predetermined period of time after the step of displaying the at least one payment method option.

21. The method of claim 13, further comprising the step of determining if a predetermined monetary amount is available to transfer from the potential recipient to the seller.

22. A method of advertising a Web site of an electronic network system by randomly offering products or services on the Web site, comprising:
    providing a random frequency device for randomly displaying an offer to one or more potential recipients visiting the Web site on the electronic network system to accept a product or service at a offer price substantially equal to zero, the randomly displayed offer having an unpredictable start time;
    providing an opportunity for the one or more potential recipients visiting the Web site on the electronic network system to accept the randomly displayed offer at the offer price within a predetermined duration of time;
    receiving an indication of acceptance of the randomly displayed offer from the one or more potential recipients visiting the Web site on the electronic network system;
    completing the sale of the product or service at the offer price through the electronic network system in response to an acceptance of the offer at the offer price by the one or more potential recipients visiting the Web site on the electronic network system; and
    removing the offer at the offer price from Web site on the electronic network system should the one or more potential recipients visiting the Web site not accept the offer at the offer price within the predetermined duration of time.

23. The method of claim 22, further comprising controlling the frequency of randomly displaying the plurality of offers on the electronic network system.

24. The method of claim 23, wherein controlling the frequency of randomly displaying the plurality of offers includes increasing a number of unknown sale offer start times when a number of potential recipients on the electronic network system increases.

25. The method of claim 22, further comprising selecting one of a plurality of different types of products or services offered based on a profile of the one or more potential recipients on the electronic network system.

26. The method of claim 25, wherein the profile of the one or more potential recipients on the electronic network system is based on a history of Internet web sites visited by the one or more potential recipients on the electronic network system.

27. The method of claim 22, wherein randomly generating an offer includes providing the seller with the opportunity to randomly display one of a plurality of different types of products or services on the electronic network system based on a plurality of different types of content displayed on the electronic network system.

28. The method of claim 22, wherein the electronic network system comprises a plurality of rooms each displaying different types of content, and the step of randomly generating an offer includes randomly displaying a first type of product or service that matches content displayed at a first room within the electronic network system and randomly displaying a second type of product or service that matches content displayed at a second room within the electronic network system.

29. A method of advertising a Web site on an electronic network system by randomly offering products or services on the Web site, comprising:
  a step for randomly displaying an offer to one or more potential recipients visiting the Web site on the electronic network system to accept a product or service at an offer price substantially equal to zero plus a cost associated with shipping the product or service to the buyer, the randomly displayed offer having an unpredictable start time;
  a step for providing an opportunity for the one or more potential recipients visiting the Web site on the electronic network system to accept the randomly displayed offer at the offer price within a predetermined duration of time;
  a step for receiving an indication of acceptance of the randomly displayed offer at the offer Price from the one or more potential recipients visiting the Web site on the electronic network system;
  a step for completing the sale of the product or service at the offer price through the electronic network system in response to an acceptance of the offer at the offer price by the one or more potential recipients visiting the Web site on the electronic network system; and
  a step for removing the offer from the electronic network system should the one or more potential recipients visiting the Web site not accept the offer at the offer price within the predetermined duration of time.

30. The method of claim 29, further comprising a step for controlling the frequency of randomly displaying the plurality of offers on the electronic network system.

31. The method of claim 30, wherein controlling the frequency of randomly displaying the plurality of offers includes increasing a number of unknown sale offer start times when a number of potential recipients on the electronic network system increases.

32. The method of claim 29, further comprising a step for selecting one of a plurality of different types of products or services offered based on a profile of the one or more potential recipients on the electronic network system.

33. The method of claim 32, wherein the profile of the one or more potential recipients on the electronic network system is based on a history of Internet web sites visited by the one or more potential recipients on the electronic network system.

34. The method of claim 29, wherein randomly generating an offer includes providing the seller with the opportunity to randomly display one of a plurality of different types of products or services on the electronic network system based on a plurality of different types of content displayed on the electronic network system.

35. The method of claim 29, wherein the electronic network system comprises a plurality of rooms each displaying different types of content, and the step for randomly generating an offer includes randomly displaying a first type of product or service that matches content displayed at a first room within the electronic network system and randomly displaying a second type of product or service that matches content displayed at a second room within the electronic network system.

* * * * *